(12) United States Patent
Chu et al.

(10) Patent No.: US 11,738,777 B2
(45) Date of Patent: Aug. 29, 2023

(54) DYNAMIC AUTONOMOUS CONTROL ENGAGEMENT

(71) Applicant: Zoox, Inc., Foster City, CA (US)

(72) Inventors: Eric Chu, San Francisco, CA (US);
Janek Hudecek, Redwood City, CA (US); Prateek Chandresh Shah, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 156 days.

(21) Appl. No.: 17/128,653

(22) Filed: Dec. 21, 2020

(65) Prior Publication Data
US 2022/0194431 A1 Jun. 23, 2022

(51) Int. Cl.
*B60W 60/00* (2020.01)
*B60W 30/18* (2012.01)
*B60W 30/09* (2012.01)

(52) U.S. Cl.
CPC ........ *B60W 60/0051* (2020.02); *B60W 30/09* (2013.01); *B60W 30/18159* (2020.02); *B60W 30/18163* (2013.01); *B60W 60/001* (2020.02); *B60W 60/0057* (2020.02)

(58) Field of Classification Search
CPC ............ B60W 60/0051; B60W 30/09; B60W 30/18159; B60W 30/18163; B60W 60/001; B60W 60/0057; B60W 30/18145; B60W 30/18154; B60W 60/0059; B60W 60/0053
See application file for complete search history.

(56) References Cited

U.S. PATENT DOCUMENTS

| 10,324,463 | B1 | 6/2019 | Konrardy |
| 10,635,764 | B2 | 4/2020 | Qin |
| 11,079,764 | B2 | 8/2021 | Nister |
| 2010/0191391 | A1 | 7/2010 | Zeng |
| 2014/0303827 | A1* | 10/2014 | Dolgov ............ B60W 60/0053 701/23 |

(Continued)

FOREIGN PATENT DOCUMENTS

GB 2570887 A 8/2019

OTHER PUBLICATIONS

The International Search Report and Written Opinion for PCT Application No. PCT/US21/62441, dated Apr. 7, 2022, 10 pages.

(Continued)

*Primary Examiner* — Nadeem Odeh
(74) *Attorney, Agent, or Firm* — Lee & Hayes, P.C.

(57) ABSTRACT

This application relates to techniques for dynamically determining whether to engage an autonomous controller of a vehicle. A computing system may receive a request to engage the autonomous controller (e.g., autonomous mode) of the vehicle. In some examples, the request may be received from a simulation computing system configured to test an updated autonomous controller in a simulation. Based on a determination that conditions associated with engaging autonomy are satisfied, the computing system engages the autonomous controller. Based on a determination that conditions associated with engaging autonomy are not satisfied, the computing system disables the engagement of the autonomous controller such that the vehicle is controlled according to an initial operational mode (e.g., manual mode, semi-autonomous mode, previous version of the autonomous controller, etc.).

20 Claims, 9 Drawing Sheets

(56) References Cited

U.S. PATENT DOCUMENTS

| | | |
|---|---|---|
| 2016/0259874 A1 | 9/2016 | Andrade |
| 2017/0132334 A1 | 5/2017 | Levinson |
| 2017/0227970 A1* | 8/2017 | Taguchi ............... G05D 1/0257 |
| 2019/0064801 A1* | 2/2019 | Frazzoli ............... G05D 1/0088 |
| 2019/0113929 A1 | 4/2019 | Mukadam |
| 2019/0129831 A1 | 5/2019 | Goldberg |
| 2019/0150847 A1 | 5/2019 | Nakayama |
| 2019/0155291 A1 | 5/2019 | Heit |
| 2019/0243371 A1 | 8/2019 | Nister et al. |
| 2019/0302761 A1 | 10/2019 | Huang |
| 2019/0310654 A1* | 10/2019 | Halder ................ G05D 1/0088 |
| 2019/0318267 A1 | 10/2019 | Zhang |
| 2019/0340315 A1 | 11/2019 | Qin |
| 2019/0382003 A1 | 12/2019 | Jiang |
| 2021/0039494 A1* | 2/2021 | Nageshkar ............. B60K 37/06 |
| 2021/0163021 A1 | 6/2021 | Frazzoli |
| 2021/0188289 A1* | 6/2021 | Oba ..................... B60W 50/14 |
| 2021/0295171 A1 | 9/2021 | Kamenev |
| 2022/0058309 A1 | 5/2022 | Safira |
| 2022/0135075 A1 | 5/2022 | Ng |
| 2022/0194420 A1 | 6/2022 | Chu et al. |
| 2023/0059562 A1 | 2/2023 | Chan |

OTHER PUBLICATIONS

Office Action for U.S. Appl. No. 17/128,761, dated Oct. 6, 2022, Chu, "Autonomous Control Engagement", 67 pages.

Office Action for U.S. Appl. No. 17/128,761, dated May 18, 2023, Chu, "Autonomous Control Engagement", 73 Pages.

\* cited by examiner

RECEIVE, AT A SECOND TIME, A SECOND REQUEST TO ENGAGE AN AUTONOMOUS CONTROLLER ASSOCIATED WITH A THE VEHICLE OPERATING IN AN ENVIRONMENT
302

DETERMINE A SECOND VEHICLE MANEUVER ASSOCIATED WITH THE VEHICLE AT THE SECOND TIME
306

DETERMINE THAT THE SECOND VEHICLE MANEUVER SATISFIES THE AUTONOMOUS CONTROL CONDITION
314

ENGAGE AUTONOMOUS CONTROL ASSOCIATED WITH THE VEHICLE
316

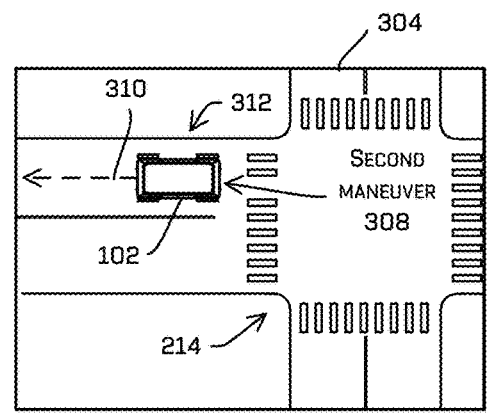

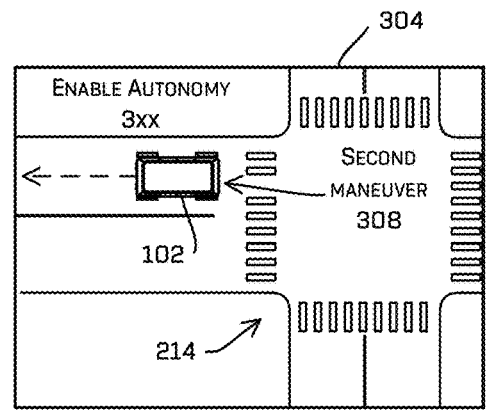

FIG. 3

DYNAMIC AUTONOMOUS CONTROL ENGAGEMENT

BACKGROUND

Vehicles are increasingly supplementing or replacing manual functionality with automatic controls. Autonomous driving, however, requires robust computing systems capable of making split-second decisions to anticipate to and/or respond to myriad events and scenarios. Robustness of a computing system (e.g., an autonomous controller) may be confirmed via physical tests, such as by driving the vehicle in multiple environments for extended periods of time and/or for numerous miles. The autonomous controller may additionally or alternatively be tested utilizing simulations configured to evaluate operating software to confirm if the system behaves as expected (e.g., safely operate vehicle to a destination). However, if an autonomous controller or test thereof is initialized at an improper time, the resulting control of the vehicle may include inaccurate results.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 illustrates a process for determining to engage autonomous control of a vehicle based on a determined state of the vehicle, in accordance with examples of this disclosure.

DETAILED DESCRIPTION

Figure 1:
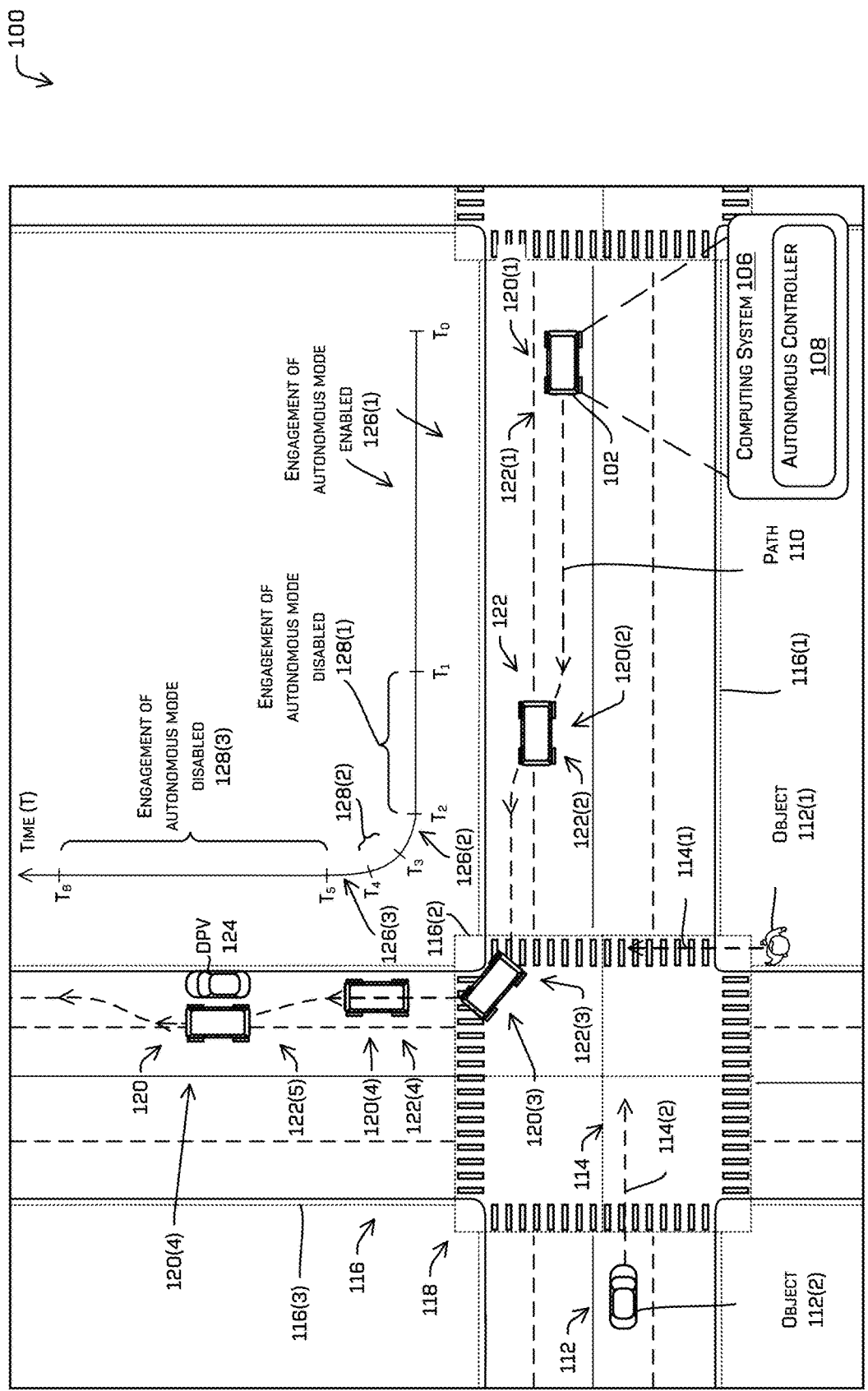
FIG. 1 is an illustration of a vehicle operating in an environment, in which a system associated with the vehicle may prevent a modification to an operational mode of the vehicle during a maneuver thereof, in accordance with examples of this disclosure.

This disclosure is directed to techniques for determining whether to enable engagement of an autonomous controller of a vehicle based on an engagement condition (e.g., a condition associated with enabling autonomy). The autonomous controller may include a system configured to detect objects, determine an action for a vehicle to take to avoid the objects, and cause the vehicle to take the action. The autonomous controller may be engaged during operation of the vehicle in an environment (e.g., online operation), such as when an autonomous mode is initiated by an operator or control logic associated with operation of the vehicle, or in a simulation representative of operation of the vehicle in the environment (e.g., offline operation). A computing system (e.g., vehicle computing system or simulation computing system) may determine whether a maneuver of the vehicle satisfies the condition associated with engagement. Based on a determination that the maneuver does not satisfy the condition, the computing system may disable an engagement of the autonomous controller, preventing the autonomous controller from controlling the vehicle. Based on a determination that the maneuver does satisfy the condition, the computing system may enable the engagement of the autonomous controller, thereby permitting the autonomous controller to control the vehicle.

In various examples, the computing system may receive data associated with operation of the vehicle in the environment. The data may include historical data associated with a previous operation of the vehicle or real-time and/or near real-time data associated with a current operation of the vehicle. The data may represent a current or previous state of the vehicle on a continuing basis (e.g., writing to a log in a particular frequency). The state of the vehicle may, in some examples, be logged in a message associated with an action or maneuver associated therewith, such as lane change action, or the like. In some examples, the data may include sensor data captured by one or more sensors on the vehicle and/or one or more remote sensors (e.g., on another vehicle, mounted in the environment, etc.), map data (e.g., one or more road segments associated with the environment and/or a vehicle path there-through), determined actions by which a controller (e.g., local or remote operator, active autonomous controller, etc.) controlled the vehicle through the environment, times associated with the actions, and the like.

In some examples, the computing system (e.g., a simulation component thereof) may be configured to generate a simulation associated with vehicle operations based on the data, such as for evaluating performance of an autonomous controller. The evaluation of the autonomous controller may be used to confirm proper algorithmic behavior thereof. For example, the computing system may generate the simulation to test the efficacy of an autonomous controller that has been updated, to ensure safe operation thereof in various environments prior to utilizing the autonomous controller in the vehicle itself. In various examples, the computing system may generate simulations utilizing techniques such as those described in U.S. patent application Ser. No. 16/376,842, filed Apr. 5, 2019 and entitled "Simulating Autonomous Driving Using Map Data and Driving Data," the entire contents of which are incorporated herein by reference.

In various examples, the simulation may represent the operation of the vehicle as controlled by a first autonomous controller in a first operational mode. In such examples, the computing system may utilize the simulation to test a second autonomous controller associated with a second operational mode. Alternatively, the first operational mode may include a manual or semi-autonomous mode of operation of the vehicle, as controlled, at least in part, by an operator. In such examples, the second operational mode may include an autonomous control mode, in which the vehicle is controlled by the autonomous controller onboard the vehicle. In at least some examples tested in simulation, such a second autonomous controller may comprise a different version of the controller to determine whether the different versions corrects or improves behavior relative to the other controller.

In various examples, the computing system may receive, at a first time, a request to engage the second operational mode. In some examples, the computing system receives the request responsive to a user input requesting to engage the second operational mode (e.g., an autonomous mode of the vehicle, the second autonomous controller, etc.). In some examples, the user input may include an input from a local or remote operator of the vehicle (e.g., press an autonomous control button), or an operator associated with the simulation (e.g., to engage test of second autonomous controller). In some examples, the request may be based on logic of one or more components associated with the vehicle.

In some examples, the computing system may receive the request during a run of the simulation (e.g., a playback associated with previous operation of the vehicle). In such examples, the request may include an instruction to engage the second operational mode (e.g., second autonomous controller) at the first time. In various examples, the first time may include a pre-determined time associated with testing a second autonomous controller, such as to ensure that multiple tests across multiple simulations are comparable to one another. In various examples, the first time may be stored in a datastore of the computing device in association with testing the second autonomous controller. In various examples, a simulation component of the computing device may generate the request based on the pre-determined time (e.g., programmed time, hard-coded time, etc.).

Responsive to receiving the request, the computing system may determine a maneuver of the vehicle at the first time. The maneuver of the vehicle may be associated with movement of the vehicle, such a lane change, staying in a lane, going around an obstacle (e.g., double-parked vehicle, traffic cones, etc.), turning, transitioning through a junction, merging, a speed variation (e.g., maintain velocity, accelerate, decelerate, etc.), a positional variation (e.g., changing a position in a lane), or the like. In some examples, the computing system may determine an object or a location associated with the maneuver. For example, the location may be associated with a stop sign, a red light, a road, an off-road area (e.g., in a parking lot or other area not associated with map data), or the like.

In various examples, the computing system may determine whether the maneuver satisfies one or more conditions associated with engagement of the autonomous controller. In various examples, the condition(s) may include that the vehicle is operating in a single lane (e.g., not changing lanes, not maneuvering around an obstacle, etc.), is clear of junctions (e.g., not transitioning through a junction), and/or is operating on a road segment associated with map data. For example, the conditions may include that the vehicle is operating in a single lane and is outside of a boundary defining a junction.

Based on a determination that the maneuver satisfies the condition(s) and based on the request, the computing system may engage the second operational mode. For example, in real-time or near-real time operation of the vehicle, based on a determination that the maneuver satisfies the condition(s), the computing system may cause the autonomous controller to control the vehicle. For another example, based on a determination that the maneuver satisfies the condition(s), the computing system may modify the operational control of the vehicle in a simulation from the first autonomous controller associated with the data (e.g., what the vehicle actually did in a scenario) to a second autonomous controller, such as to test the second autonomous controller (e.g., determine how the second autonomous controller would handle the scenario).

Based on a determination that the maneuver does not satisfy the condition(s) at the time associated with the request, the computing system may disable an engagement of the second operational mode. In some examples, disabling an engagement of the second operational mode may prevent a modification of the operational mode from the first operational mode to the second operational mode. In the real-time or near real-time example, the computing system may prevent engagement of the autonomous mode of the vehicle. In the simulation example, the computing system may prevent engagement of the second autonomous controller, maintaining operation of the vehicle in the first operational mode (e.g., as the vehicle historically traveled through the environment). In some examples, the computing system may store an indication of the failed engagement of the second operational mode. In various examples, the computing system may cause a notification of the failed engagement to be presented to the operator of the vehicle and/or the simulation. In such examples, limiting switching over to the second autonomous controller may ensure that there is no abrupt change in state and/or substrate of the vehicle necessary for smoothly transitioning between controllers. In those examples in which such a confirmation is not made, abruptly switching to the second autonomous controller at an instant in time may cause unresolved issues due to an improper evolution of internal state (or substrates) of the vehicle.

Additionally, or in the alternative, the computing system may receive data associated with a previous operation of the vehicle and may identify maneuvers associated with the previous vehicle operation. In some examples, the computing system may identify one or more maneuvers that fail to satisfy the condition(s). In some examples, the computing system may determine a start time and a stop time associated with each maneuver of the one or more maneuvers that fail to satisfy the condition(s). In various examples, the data may include pre-determined start and stop times associated with maneuvers that fail to satisfy the condition(s). In such examples, the computing system may be configured to identify maneuvers that fail to satisfy the condition(s) in real-time or near-real time and store start and stop times associated therewith in a datastore. The computing system may process the pre-determined start and stop times associated with the maneuvers that fail to satisfy the conditions to determine when to disable engagement of the second operational mode. including the start and stop times. In various examples, the computing system may disable engagement of the second operational mode during a time period defined by the start time and the stop times associated with the maneuver(s) that fail to satisfy the condition(s). As above, such maneuvers may be indicative of one or more events in which the switching would not preserve state or otherwise where the state would not have been properly evolved for analysis.

In some examples, the computing system may identify a first maneuver and a second maneuver of the vehicle operation that fail to satisfy the condition(s). In some examples, the computing system may enable engagement of the second operational mode between a stop time associated with the first maneuver and a start time associated with the second maneuver, or vice versa. In some examples, the computing system may identify one or more maneuvers of the vehicle that satisfy the condition(s) and may determine associated start and stop times. In such examples, the computing system may enable engagement of the second operational mode during a time period defined by the start and stop time associated with one of the maneuver(s) that satisfy the condition(s).

In various examples, the computing system may determine an engagement time of the second operational mode based at least in part on the times associated with enabled engagement thereof. In some examples, the computing system may generate the scenario based at least in part on the engagement time. In some examples, the computing system may initiate (e.g., start) the simulation a threshold amount of time (e.g., 3 seconds, 5 seconds, etc.) prior to the engagement time associated with the maneuver that satisfies the condition.

In some examples, the computing system may run the simulation and/or the second autonomous controller for a pre-determined amount of time (e.g., 30 seconds, 60 seconds, etc.). In some examples, the computing system may run the simulation and/or the second autonomous controller until the vehicle reaches a destination associated with the historical data. In some examples, the computing system may run the simulation and/or the second autonomous controller until the vehicle path diverges from the vehicle path associate with the historical data (e.g., the second autonomous controller determines an action to take that is different from that determined by the first autonomous controller). In some examples, the divergence may include a threshold divergence (e.g., greater than 2 meters from an original path of the vehicle, difference in speed above 5 kilometers per hour, direction of travel greater than three degrees different, etc.).

In various examples, the computing system may generate the simulation to test a control of the vehicle by the second autonomous controller responsive to a particular scenario. In some examples, the computing system may run the simulation until the second autonomous controller determines an action to take with respect to the particular scenario. In some examples, responsive to determining that second autonomous controller determines the action, the computing system may stop the simulation. In various examples, the computing system may determine a time period associated with determining an efficacy of the second autonomous controller in controlling the vehicle through the particular scenario. In such examples, the computing system may determine to stop the simulation after an expiration of the time period.

In various examples, the computing system may be configured to monitor a real-time and/or near real-time operation of the vehicle and may identify maneuvers of the vehicle that fail to satisfy the condition(s) in real-time and/or near real-time. In some examples, the computing system may log start times and stop times associated with maneuvers that fail to satisfy the condition(s) and may store them in a datastore associated with the computing device. In various examples, a simulation computing system may utilize the start and stop times as pre-processed data representative of times associated with enabling or disabling engagement of second operational mode.

The simulation computing system (or simulation component thereof) may be configured to generate a simulation and/or initiate the simulation (e.g., run the simulation) at a first time. At initiation, the vehicle (e.g., a simulated vehicle in the simulation) may be controlled by a first autonomous controller, such as based on the historical data associated with a previous operation of the vehicle. The simulation computing system may be configured to engage a second autonomous controller at a time after initiation of the simulation. An engagement of the second autonomous controller may cause the second autonomous controller to control a second simulated vehicle in the simulation. The second simulated vehicle may be a same or a different simulated vehicle from the first simulated vehicle. The simulation computing system may be configured to determine a stop time associated with the simulation and may stop the simulation (e.g., cease movement of the simulated vehicle(s) in the simulation) at the stop time. As described herein, the simulation may be utilized to evaluate a performance of the second autonomous controller.

Depending on results associated with the second controller run in simulation, performance of the vehicle using the second controller may be compared with control using the first controller. Based on a relative performance of the controllers (e.g., with respect to safety, comfort, etc.) is improved, such a second controller may be transmitted (or otherwise flagged) for the vehicle to use in place of the first autonomous controller. Otherwise, the second autonomous controller may be discarded. Additionally, or alternatively, various metrics (e.g., costs) associated with the evaluation in simulation may inform a user as to issues (or potentially issues) with one or more of the controllers tested.

The techniques discussed herein may improve the functioning of an autonomous vehicle in many ways. For example, the techniques discussed herein may provide simulations for testing an ability of an autonomous controller to safely operate in a dynamic environment. At least by enabling engagement of the autonomous controller in a simulation during a time associated with a maneuver that satisfies one or more conditions, the computing system enhance the efficacy of the simulation. For another example, the techniques described herein may ensure that the condition(s) associated with vehicle operations are met prior to enabling the engagement of an autonomous mode of a vehicle, thereby ensuring safe operation thereof. As such, the techniques described herein may greatly improve safety of autonomous vehicle operations.

Additionally, the techniques described herein may improve the functioning of a simulation computing device. As discussed above, the simulation computing device may be pre-programmed with an engagement time associated with a test of an autonomous controller (e.g., the second autonomous controller). The simulation computing device may run a plurality of simulations utilizing data associated with a plurality of vehicles, the plurality of simulations including a same or similar engagement time (e.g., programmed or hard-coded engagement time). If permitted to engage the autonomous controller at a time associated with a maneuver that does not satisfy a condition of engagement, the simulation may return inaccurate results associated with the function of the autonomous controller. For instance, the autonomous controller may be engaged during a middle of a lane change maneuver, a situation in which the autonomous controller is not designed to handle. At least because the autonomous controller is not designed to activate in the middle of a lane change maneuver, the autonomous controller may not function as expected and the results of the simulation may be inaccurate. The inaccurate results may be untrustworthy and may result in the simulation computing device running a plurality of additional scenarios to ensure that the autonomous controller functions as expected. However, by utilizing the techniques described herein, the simulation computing device may ensure that the autonomous controller is engaged at a time associated with a maneuver that satisfies the conditions for engagement, thereby ensuring accurate results associated with the operation of the autonomous controller. Accordingly, by utilizing the techniques described herein, the simulation computing device may save processing power and/or memory by running fewer simulations to test the operation of the autonomous controller.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in an aviation or nautical context, or in any system using planning techniques.

FIG. 1 is an illustration of a vehicle 102 operating in an environment 100, in which a computing system 106 associated with the vehicle 102 may prevent a modification to an operational mode of the vehicle during a maneuver thereof. In various examples, the computing system 106 may include a vehicle computing system located onboard the vehicle and configured to control operations thereof, such as utilizing an autonomous controller 108. In some examples, the computing system 106 may include a simulation computing system that is communicatively coupled to the vehicle 102 and configured to generate simulations for testing the autonomous controller 108. For example, and as will be described in further detail with regard to FIG. 5, the computing system may include a vehicle computing device 504 or a remote computing device 534 comprising a simulation component 536.

In various examples, the vehicle 102 may include an autonomous or semi-autonomous vehicle 102. For example, the vehicle 102 may be configured to operate in a manual mode or a semi-autonomous operational mode (e.g., a first operational mode), such as that controlled, at least in part, by an operator of the vehicle (not illustrated). The vehicle 102 may additionally be configured to operate in an autonomous mode (e.g., a second operational mode), in which the autonomous controller 108 may control operations of the vehicle 102. The autonomous controller 108 may be configured to control the vehicle along a planned path 110 thereof, detect objects 112, determine an action for a vehicle 102 to take to avoid the objects 112, and cause the vehicle 102 to take the action.

In various examples, the autonomous controller 108 may control the vehicle 102 utilizing sensor data captured by one or more sensors on the vehicle and/or one or more remote sensors (e.g., on another vehicle, mounted in the environment, etc.). The sensor(s) may include cameras, motion detectors, lidar, radar, and the like. In various examples, the autonomous controller 108 may control the vehicle 102 based on object data associated with one or more objects 112 in the environment, such as the objects 112 detected based on the sensor data. The object data may include an object location, an object type or classification (e.g., car, truck, pedestrian, bicyclist, etc.), and/or a predicted object trajectory 114 of the object 112.

In various examples, the autonomous controller 108 may be configured to determine one or more predicted object trajectories 114 associated with the object 112 based on the sensor data. The trajectories 114 may be determined using a probabilistic heat map (e.g., discretized probability distribution) to predict object 112 behavior, such as those described in U.S. patent application Ser. No. 15/807,521, filed Nov. 8, 2017, and entitled "Probabilistic Heat Maps for Behavior Prediction," and the U.S. Pat. No. 10,671,076, issued Jun. 2, 2020, and entitled "Trajectory Prediction of Third-Party Objects Using Temporal Logic and Tree Search," the entire contents of which are incorporated herein by reference. In some examples, the one or more predicted object trajectories 114 may be based on a top-down representation of an environment 100, such as by utilizing the techniques described in U.S. patent application Ser. No. 16/151,607 filed Oct. 4, 2018 and entitled "Trajectory Prediction on Top-Down Scenes," and in U.S. patent application Ser. No. 16/504,147 filed Jul. 5, 2019 and entitled "Prediction on Top-Down Scenes based on Action Data," the entire contents of which are incorporated herein by reference. In various examples, the one or more predicted object trajectories 114 may be determined utilizing tree search methods, temporal logic formulae, and/or machine learning techniques. The autonomous controller 108 may utilize the object data including the predicted object trajectories 114 and/or the top-down representation of the environment 100 to control the vehicle 102.

In some examples, the autonomous controller 108 may control the vehicle 102 utilizing map data comprising one or more road segments 116 (e.g., drivable surfaces) on which one or more vehicles 102 may travel through a geographic area, such as, for example, utilizing simultaneous localization and mapping (SLAM) techniques. By way of non-limiting example, the map data may include a 3D mesh of the road segments 116 and/or of the geographic area including the road segments 116, as well as aspects about the road segments 116, including but not limited to extents of the road segments 116, junctions 118 associated with the road segments, road marking information, road surfaces including potholes and/or bumps, or the like. In some examples, the autonomous controller may control the vehicle along a path 110 of the vehicle 102 through the environment 100. The path 110 may include a route from a location 120 (e.g., a first location 120(1)) to a destination (not illustrated) along one or more road segments 116. For example, the path 110 of the vehicle 102 illustrated in FIG. 1 includes the vehicle 102 traveling from the initial location 120(1) along a first road segment 116(1), turning right at a second road segment 116(2) associated with a junction 118, and continuing operation along a third road segment 116(3).

In various examples, the computing system 106 may store the data associated with vehicle 102 operation through the environment. In various examples, the stored data may include data processed by the autonomous controller 108, such as that utilized by the autonomous controller 108 to determine one or more actions to take (e.g., sensor data, map data, an initial location 120(1), a destination, a route, etc.). In various examples, the stored data may additionally include one or more determined actions by which the controller (e.g., operator or autonomous controller 108) controlled the vehicle 102 through the environment 100. In at least one example, the vehicle computing system may provide the data associated with the operation of the vehicle 102 to a remote computing system, such as, for example, to generate simulations to test the performance of an autonomous controller 108. For example, the remote computing system may update a software component of the autonomous controller 108 and may generate a simulation to test the performance of the updated autonomous controller 108.

In examples in which the computing system 106 is associated with a simulation computing system, the computing system 106 may receive the historical data associated with the vehicle 102 operation. In such examples, the historical data may represent the vehicle 102 operation in a first operational mode. The first operational mode associated with the historical data may include an autonomous, semi-autonomous, or manual mode of operation. In examples in which the first operational mode includes an autonomous mode, the computing system may generate the simulation to test a second autonomous controller 108 (e.g., a second operational mode), such as to determine whether the second autonomous controller 108 operates differently from a first autonomous controller 108 (e.g., diverging paths between the historical data and the simulation). In examples in which the first operational mode includes a manual or semi-autonomous mode of operation, the computing system 106 may generate the simulation to test a performance of an autonomous controller 108 as compared to a manually operated vehicle 102. In such examples, the first operational mode represents a manual or semi-autonomous mode and the second operational mode represents an autonomous mode.

In the illustrative example, the vehicle 102 travels along a path 110 from the first location 120(1) associated with a first time (To). In some examples, the computing system 106 may generate the simulation to start at the first location 120(1) and/or at the first time (To) based on a particular test associated with the autonomous controller 108. For example, the computing system 106 may determine to test an action performed by the autonomous controller 108 in reaction to a first object 112(1) traveling on a predicted object trajectory 114(1). In some examples, the computing system 106 may initialize the scenario (e.g., start the simulation) with the vehicle 102 at the first location 120(1) based on a determination that the vehicle 102 is a threshold distance (e.g., 50 meters, 100 yards, etc.) and/or a threshold amount of time (e.g., 3 seconds, 6 seconds, etc.) away from the junction 118 associated with the first object 112(1).

In various examples, during operation of the vehicle 102 in the simulation and/or in real-time and/or near real-time, the computing system 106 may receive a request to engage the autonomous controller 108 in a second operational mode. As discussed above, in examples of manual or semi-autonomous operation of the vehicle 102, the second operational mode may include an autonomous mode of operation. In such examples, the request to engage may be received based on user input from the operator of the vehicle 102. In various examples, the operator may include a remote operator, such as an operator located remotely from the vehicle 102 and configured to control an operation thereof. In such examples, the user input may include an instruction to engage the autonomous controller.

In some examples, the computing system 106 may receive the request to engage the second operational mode during an autonomous operation of the vehicle. In various examples, the request and/or data associated with a second autonomous controller 108 may be provided to the computing system 106 by a remote computing device, such as in a real-time update of the autonomous controller 108. For example, the remote computing device may generate an update to the autonomous controller 108 and may send an updated autonomous controller 108 (e.g., second autonomous controller 108) to the computing system 106 during vehicle 102 operation (e.g., in real-time and/or near real time). The remote computing device may send, concurrently or consecutively, a request to engage the updated autonomous controller 108. The computing system 106 may receive the request and may determine whether to engage the second operational mode.

In simulations based on historical data, computing system 106 may receive the request to engage the second operational mode from an operator of the simulation and/or from a simulation component of the computing system 106. In various examples, the computing system may receive the request to engage the second operational mode based on a pre-determined time associated with initiating the second operational mode. The pre-determined time may include a time stored in association with testing the second autonomous controller 108. For example, the pre-determined time may be 2 seconds after initializing (e.g., starting) the simulation. Though this is merely an illustrative example and is not intended to be limiting.

In various examples, the computing system 106 may receive the request and may determine a maneuver 122 associated with the vehicle at the time associated with the request. The maneuver 122 of the vehicle 102 may be associated with movement of the vehicle 102, such a lane change, staying in a lane, going around an obstacle (e.g., double-parked vehicle, traffic cones, etc.), turning, transitioning through a junction, merging, a speed variation (e.g., maintain velocity, accelerate, decelerate, etc.), a positional variation (e.g., changing a position in a lane), or the like. For example, a first maneuver 122(1) may include the vehicle 102 traveling in a first lane associated with the first road segment 116(1), a second maneuver 122(2) may include a lane change, a third maneuver 122(3) may include a right turn at the junction 118 associated with the second road segment 116(2), a fourth maneuver 122(4) may include traveling in a second lane associated with a third road segment 116(3), and a fifth maneuver 122(5) may include an movement around an obstacle, such as a double parked vehicle 124 (illustrated as DPV 124).

In various examples, the computing system may determine whether to engage the second operational mode at a time associated with the request based on whether the maneuver 122 satisfies one or more conditions associated with autonomy engagement. The condition(s) may include conditions that the vehicle is operating in a single lane (e.g., not changing lanes, not maneuvering around an obstacle, etc.), is clear of junctions (e.g., not transitioning through a junction, a threshold distance away from the junction, etc.), is operating a threshold distance away from one or more objects 112, and/or that an object trajectory 114 associated with an object 112 will not intersect the path 110 of the vehicle 102 within a threshold distance of the vehicle location 120 at the time of the request. For example, the conditions may include that the vehicle is operating in a single lane and is outside of a boundary defining a junction.

In some examples, the condition(s) may include a condition that the vehicle 102 is operating on a road segment 116 associated with the map data, such as to ensure that the autonomous controller has sufficient information about the road segment 116 to safely control the vehicle autonomously (e.g., lane markings, direction of travel, etc.). In such examples, the computing system 106 may determine whether to engage the second operational mode at a time associated with the request based on the location 120 of the vehicle 102 at the time the request is received. For example, the computing system 106 may determine that the vehicle is operating in and/or exiting a parking lot at the time associated with the request to engage autonomy. The computing system 106 may determine that the location 120 associated with the vehicle 102 (e.g., associated with the maneuver) operating in and/or exiting a parking lot does not satisfy the condition(s) of autonomy engagement. For another example, the computing system may determine that a location 120 of the vehicle, such as the first location 120(1), is associated with a road segment 116(1). The computing system 106 may determine that the first location 120(1) satisfies the condition associated with operating on a road segment 116 associated with the map data.

Based on a determination that the maneuver 122 and/or location 120 associated with the maneuver 122 satisfy the condition(s) associated with autonomy engagement, the computing system 106 may engage the second operational mode at the time associated with the request. In a real-time or near real-time operation of the vehicle, the computing system 106 may modify the control of the vehicle from a first operational mode (e.g., manual mode, semi-autonomous mode, autonomous mode controlled by a first autonomous controller 108) to a second operational mode (e.g., autonomous control by the first or a second autonomous controller 108). In a simulation, the computing system may modify the control of the vehicle 102 from the first operational mode associated with the historical operation of the vehicle in the environment 100 to a second operational mode (e.g., a second autonomous controller 108). For example, the computing system 106 may receive the request at a time between the initial time (To) and a first time ($T_1$) and may determine that the maneuver 122(1) associated with the time period defined by (To) and ($T_1$) satisfies the conditions of autonomy engagement. The computing system 106 may thus determine to enable engagement of the autonomous mode at the time based on the request (e.g., illustrated as engagement of autonomous mode enabled 126(1)).

Based on a determination that the maneuver 122 and/or location 120 associated with the vehicle 102 do not (e.g., fail to) satisfy the condition(s) associated with autonomy engagement, the computing system 106 may disable an engagement of the second operational mode (illustrated as engagement of autonomous mode disabled 128). Disabling the engagement of the second operational mode may prevent a modification of the operational mode from the first operational mode to the second operational mode. In the real-time or near real-time example, the computing system 106 prevents prevent engagement of the autonomous mode of the vehicle. In the simulation example, the computing system 106 prevent engagement of the second autonomous controller, maintaining operation of the vehicle 102 in the first operational mode (e.g., as the vehicle historically traveled through the environment).

In some examples, the computing system 106 may store an indication of the failed engagement of the second operational mode and/or data associated therewith. In some examples, the data may include a timestamp associated with the request, a maneuver 122 associated with the vehicle 102 and/or a location 120 of the vehicle during the maneuver 122 at the time of the request, one or more objects 112 detected in the environment (e.g., within a threshold distance of the vehicle 102 at the time of the request), object trajectories associated with the one or more objects 112, and the like. In various examples, the computing system may cause a notification of the failed engagement to be presented to the operator of the vehicle and/or the simulation. In such examples, the computing system may include a pop-up notification presented via a user interface, an aural signal, haptic signal a visual signal (e.g., flashing light, solid light, etc.), and/or any other type of notification usable to indicate to an operator that the engagement of the autonomous mode was not successful. Of course, such logged timestamps may also be used in simulation to determine when engagement of an autonomous controller would be permissible at various times when playing back previously recorded logged data (e.g., of the previously driven area).

Additionally, or in the alternative, the computing system 106 may receive data associated with a previous operation of the vehicle 102 (e.g., historical operation data) and may identify one or more maneuvers 122 associated with the previous operation of the vehicle 102. In some examples, the computing system may identify one or more maneuvers 122 that do not satisfy the condition(s) associated with autonomy engagement. For example, the computing system 106 may identify the second maneuver 122(2) as a lane change that does not satisfy the condition(s), the third maneuver 122(3) as an operation in a junction (e.g., turn in the junction) that does not satisfy the condition(s), and the fifth maneuver 122(5) as a movement around DPV 124 that does not satisfy the condition(s).

In various examples, responsive to identifying a maneuver 122 that does not satisfy the condition(s), such as the second maneuver 122(2), the computing system 106 may determine a start time and a stop time associated with the maneuver 122. The start time associated with the maneuver 122 that does not satisfy the condition(s) may include a time at which the first controller (e.g., the first autonomous controller 108, the operator, etc.) instructs a drive system to modify a vehicle trajectory of the vehicle 102 and/or a time buffer (e.g., 0.1 seconds prior to the start of the maneuver 122). In various examples, the stop time associated with the maneuver 122 that does not satisfy the condition may include a time at which the first controller instructs the drive system to modify the vehicle trajectory to correspond to a maneuver 122 that satisfies the condition(s)) and/or an additional time buffer (e.g., 0.2 seconds after the end of the maneuver 122).

In some examples, the computing system 106 may determine to disable the engagement of the autonomous mode 128 during a time period defined by the start time and the stop time associated with a maneuver 122 that does not satisfy the condition(s). In such examples, the computing system 106 may automatically deny a request to engage the autonomous mode received during the time period, such as without performing additional processing to determine whether the maneuver satisfies the condition(s). For example, the computing system 106 determines that the start time associated with the second maneuver 122(2) that does not satisfy the condition(s) is ($T_1$) and a stop time associated with the second maneuver is ($T_2$). The computing system 106 determines to disable the engagement of the autonomous mode 128(1) during the time period defined by ($T_1$) and ($T_2$). Accordingly, responsive to receiving a request to engage the autonomous controller 108 between ($T_1$) and ($T_2$), the computing system 106 may automatically deny the request and prevent the autonomous controller 108 from engaging.

In various examples, the computing system 106 may process the data to identify a maneuver 122 during a first time period that does not satisfy the condition(s), such as second maneuver 122(2) and another maneuver 122 during a second time period that does not satisfy the condition(s), such as the third maneuver 122(3). In some examples, the computing system 106 may enable engagement of the autonomous mode 126 between a stop time associated with the second maneuver 122(2) and a start time associated with the third maneuver 122(3), as illustrated by engagement of autonomous mode enabled 126(2) between the stop time ($T_2$) associated with the second maneuver 122(2) and the start time ($T_3$) associated with the third maneuver 122(3).

In various examples, the data associated with the previous operation of the vehicle 102 may include logged (e.g., stored) start and stop times associated with maneuvers 122 that do not satisfy the condition(s), such as maneuvers 122(2), 122(3) and 122(5). In such examples, a computing system 106 associated with the vehicle 102 (e.g., the vehicle computing system) may identify, in real-time or near real-time, the maneuvers 122 that do not satisfy the condition(s) and may store data associated with the respective start and stop times in a datastore. A computing system 106 associated with the simulation may process the data associated with the maneuvers 122 that do not satisfy the condition(s) to quickly identify time periods associated with disabling the engagement of the autonomous mode 128.

The computing system 106 associated with the vehicle 102 may additionally or alternatively identify, in real-time or near real-time, the maneuvers 122 that satisfy the condition(s) and may store the respective start and stop times in the datastore. The computing system 106 associated with the vehicle 102 may then provide the start and stop times to the computing system 106 associated with the simulation, as a portion of the data associated with the previous operation of the vehicle 102. The computing system 106 associated with the simulation may process the data associated with the maneuvers 122 that satisfy the condition(s) to quickly identify time periods associated with enabling the engagement of the autonomous mode 126.

In some examples, the computing system 106 may identify one or more maneuvers 122 of the vehicle that satisfy the condition(s) and may determine associated start and stop times associated therewith. The computing system 106 may determine to enable engagement of the autonomous mode 126 during a time period defined by the start time and the stop time associated with the maneuver 122 that satisfies the condition(s). For example, the computing system 106 may determine that a fourth maneuver 122(4) associated with traveling in a single lane on the road segment 116(3), such as between the turning maneuver 122(3) at the junction 118 and the maneuver around an obstacle maneuver 122(5) satisfies the condition(s). The computing system 106 may determine a start time associated with the maneuver to include a time ($T_4$) and a stop time associated with the maneuver 122(4) to include a time ($T_5$). In various examples, the computing system 106 may be configured to enable engagement of the autonomous mode 126(3) during the time period defined by the start time ($T_4$) and the stop time ($T_5$) associated with the maneuver 122(4) that satisfies the criteria. In such examples, responsive to receiving a request to engage the autonomous controller 108 during the time period between ($T_4$) and ($T_5$), the computing system 106 may automatically engage the autonomous controller 108, such as without further data processing to determine whether the time of the request is associated with the maneuver 122(4) that satisfies the condition(s).

In some examples, the computing system 106 may determine an engagement time for the simulation based on the time periods associated with disabling the engagement of the autonomous mode 128 and/or the time periods associated with enabling the engagement of the autonomous mode 126. In some examples, the computing system 106 determines the engagement time based on a time that is not associated with a time period corresponding to the engagement of autonomous mode being disabled 128. In some examples, the computing system 106 determines the engagement based on a time that is associated with a time period corresponding to the engagement of the autonomous mode being enabled 126.

In some examples, the computing system 106 may generate the simulation based at least in part on the engagement time. In some examples, the computing system may initiate (e.g., start) the simulation a threshold amount of time (e.g., 0.5 seconds, 3 seconds, 5 seconds, etc.) prior to the engagement time associated with the maneuver that satisfies the condition. In such examples, the first operational control mode (e.g., first controller) associated with the historical data may control the vehicle 102 for the threshold amount of time. For example, a time ($T0$) associated with an initiation of the simulation may be 1 second prior to the engagement time that is associated with enabling the second operational mode.

In various examples, the computing system 106 may program the simulation to run for a pre-determined amount of time (e.g., 10 seconds, 15 seconds, etc.). In some examples, the pre-determined amount of time may be determined based on a test associated with the autonomous controller 108. In such examples, the computing system 106 may be configured to run the simulation for the amount of time necessary to complete the test of the autonomous controller 108.

In some examples, the computing system 106 may generate the simulation to run the simulation and/or the second autonomous controller 108 until the vehicle 102 reaches a destination associated with the historical data. In some examples, the computing system 106 may run the simulation and/or the second autonomous controller until the vehicle path diverges from the vehicle path associated with the historical data (e.g., the second autonomous controller 108 determines an action to take that is different from that determined by the first autonomous controller 108). In some examples, the divergence may include a threshold divergence (e.g., greater than 1.5 meters from an original path of the vehicle, difference in speed greater than 10 miles per hour, direction of travel greater than five degrees different, etc.).

In various examples, the computing system 106 may generate the simulation to test a control of the vehicle 102 by the second autonomous controller 108 responsive to a particular scenario. In some examples, the computing system may run the simulation from the engagement time until the second autonomous controller 108 determines an action to take with respect to the particular scenario. In some examples, responsive to determining that second autonomous controller 108 determines the action, the computing system 106 may stop the simulation. For example, the computing system 106 may generate the simulation to verify that the second autonomous controller 108 yields to pedestrians operating proximate a crosswalk. The computing system may initiate the simulation at time (To), a threshold amount of time and/or a threshold distance from the junction 118 associated with the pedestrian object 112(1). The computing system may determine an engagement time associated with the enabled engagement of the autonomous mode and may cause the autonomous controller 108 to control the vehicle 102 (e.g., a simulated vehicle 102 in the simulation) through the environment 100, starting at the engagement time. The computing system 106 may determine that the autonomous controller 108 causes the vehicle 102 to yield to the object 112(1) (not illustrated in FIG. 1), such as prior to proceeding through the junction 118. Based on a determination that the autonomous controller 108 yields to the object 112(1), the computing system 106 may stop the simulation.

In various examples, the computing system 106 may determine a time period (e.g., 0.5 seconds, 1 second, etc.)

associated with determining an efficacy of the second autonomous controller 108 in controlling the vehicle 102 through the particular scenario (e.g., yield to pedestrian example above). In such examples, the computing system 106 may determine to stop the simulation after an expiration of the time period. In various examples, the time period may include a time associated with determining whether the second autonomous controller 108 controlled the vehicle as expected in the particular scenario. In at least one example, the time period may be associated with little to no divergence (e.g., less than a threshold amount of divergence) from the actual travel of the vehicle 102. In such an example, the time period may include a time associated with determining the action that the second autonomous controller 108 takes in the scenario plus a short time buffer.

In various examples, the time period may be determined based on a divergence between a location 120 of the vehicle 102 as controlled by the first autonomous controller (e.g., based on historical data) and a location 120 of the simulated vehicle 102 controlled by the second autonomous controller 108. In such examples, based on a determination that the locations 120 associated with the vehicle 102 and the simulated vehicle 102 are at or above a threshold distance (e.g., 10 meters, 20 feet, etc.) from one another, the computing system 106 may determine to stop the scenario.

Figure 2:
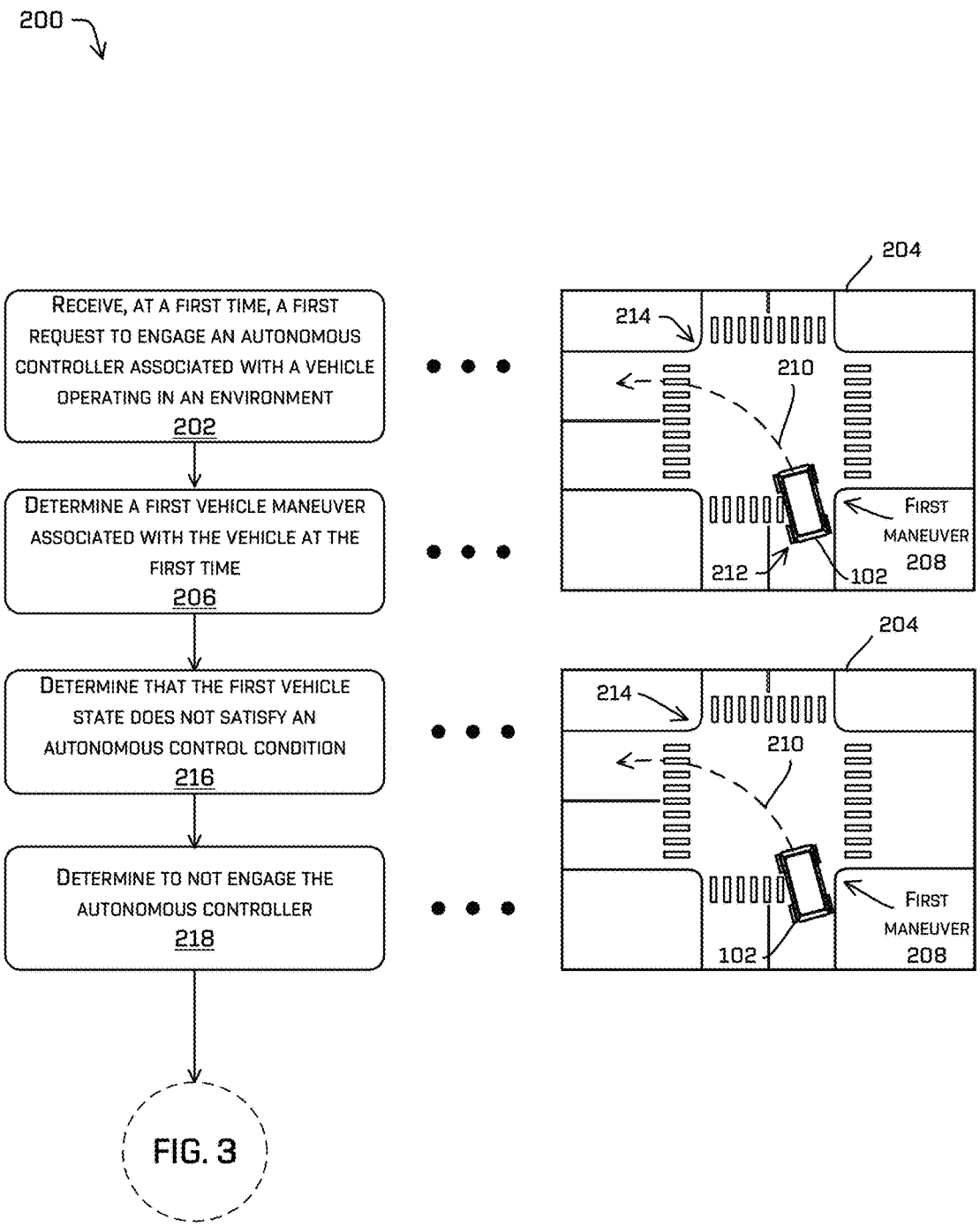
FIG. 2 illustrates a process for determining to not engage autonomous control of a vehicle based on a determined state of the vehicle, in accordance with examples of this disclosure.

FIG. 2 illustrates a process 200 for determining to not engage an autonomous controller of a vehicle 102, such as autonomous controller 108, based on a determined maneuver of the vehicle 102, in accordance with examples of this disclosure. In various examples, a vehicle computing system of the vehicle 102 may determine whether to engage the autonomous controller of the vehicle 102. In some examples, a simulation computing system may determine whether to engage the autonomous controller of the vehicle 102 while running a simulation, such as a simulation generated to test a function of the autonomous controller.

At operation 202, the computing system (e.g., the vehicle computing system or simulation computing system) receives, at a first time, a first request to engage an autonomous controller associated with the vehicle 102 operating in an environment 204, such as environment 100. In some examples, the computing system receives the request responsive to a user input requesting to engage the autonomous controller (e.g., an autonomous mode of the vehicle, a second autonomous controller, etc.) or programmable logic associated with the vehicle providing an indication to switch to autonomy. In some examples, the user input may include an input from an operator of the vehicle (e.g., an indication that the operator engaged an autonomous control button or other controller), or an operator associated with the simulation. In some examples, the computing system receives the first request from a simulation computing system, such as based on a pre-determined engagement time associated with engaging the autonomous controller.

At operation 206, the computing system determines a first vehicle maneuver 208 (e.g., first maneuver 208), such as maneuver 122, associated with the vehicle 102 at the first time. The first maneuver 208 may be associated with movement of the vehicle, such a lane change, staying in a lane, going around an obstacle (e.g., double-parked vehicle, traffic cones, etc.), turning, transitioning through a junction, merging, a speed variation (e.g., maintain velocity, accelerate, decelerate, etc.), a positional variation (e.g., changing a position in a lane), or the like. In various examples, the computing system may determine the first maneuver 208 based on a vehicle trajectory 210 associated with the vehicle 102 and/or a first location 212 of the vehicle 102 associated with the maneuver 208, such as location 120. For example, the computing system may determine that the first maneuver 208 includes a left turn at a junction 214, such as junction 118, based in part on the vehicle trajectory 210 and the first location 212.

At operation 216, the computing system determines that the first vehicle maneuver 208 does not satisfy an autonomous control condition. In various examples, the autonomous control conditions may include that the vehicle 102 is operating in a single lane (e.g., not changing lanes, not maneuvering around an obstacle, etc.), is clear of junctions (e.g., not transitioning through a junction), and/or is operating on a road segment associated with map data. In at least one example, the autonomous control condition may include a condition that a state of the vehicle remains constant (e.g., continue in lane) during the first maneuver 208. In some examples, at least because the computing system determines a state change of a left turn through a junction, the computing system determines that the first maneuver 208 does not satisfy the autonomous control condition.

At operation 218, the computing system determines to not engage the autonomous controller at the first time, such as based on a determination that the first vehicle maneuver 208 does not satisfy the autonomous control conditions. In some examples, the computing system may store an indication of the failed engagement of the autonomous controller. In various examples, the computing system may cause a notification of the failed engagement of the autonomous controller to be presented to an operator of the vehicle 102 and/or an operator of the simulation. As discussed above, the notification may include a visual notification (e.g., flashing light, solid light, pop-up notification via a user interface, etc.), an aural signal, a haptic signal, and/or any other type of notification usable to indicate to an operator that the engagement of the autonomous controller was not successful.

In various examples, the computing system may later (e.g., at a second time) send a second request to engage the autonomous controller. The computing system may determine a maneuver associated with the second time and, based on a determination that the maneuver associated with the second time satisfies the condition, may determine to engage the autonomous controller, such as that illustrated in FIG. 3.

FIG. 3 illustrates a process 300 for determining to engage an autonomous controller of a vehicle 102, such as autonomous controller 108, based on a determined second maneuver of the vehicle 102, in accordance with examples of this disclosure. In various examples, a vehicle computing system of the vehicle 102 may determine whether to engage the autonomous controller of the vehicle 102. In some examples, a simulation computing system may determine whether to engage the autonomous controller of the vehicle 102 while running a simulation, such as a simulation generated to test a function of the autonomous controller.

At operation 302, the computing system (e.g., the vehicle computing system or simulation computing system) receives, at a second time, a second request to engage an autonomous controller associated with a vehicle 102 operating in an environment 304, such as environment 100. In some examples, the computing system receives the request responsive to a user input requesting to engage the autonomous controller (e.g., an autonomous mode of the vehicle, a second autonomous controller, etc.). In some examples, the second request may include a second attempt by the operator and/or simulation computing system to engage the autonomous controller, such as after the first (unsuccessful) attempt described with respect to FIG. 2. In some examples, the computing system receives the second request from a simulation computing system, such as based on a pre-determined (e.g., stored) engagement time associated with engaging the autonomous controller. In some examples, the pre-determined engagement time may include a stored second engagement time (e.g., back-up engagement time), such as if the first engagement time is unsuccessful.

At operation 306, the computing system determines a second vehicle maneuver 308 (e.g., second maneuver 308), such as maneuver 122, associated with the vehicle 102 at the second time. In various examples, the computing system may determine the second maneuver 308 based on a vehicle trajectory 310 associated with the vehicle 102 and/or a second location 312 of the vehicle 102, such as location 120, associated with the maneuver 308. For example, the computing system may determine that the second maneuver 208 includes the vehicle 102 staying in a lane, clear of the junction 214, such as a after completing the first maneuver 208 illustrated in FIG. 2.

At operation 314, the computing system determines that the second vehicle maneuver 308 satisfies the autonomous control condition. For example, the computing system determines that the constant state of the vehicle traveling in the lane and clear of the junction 214, according to the second maneuver 308.

At operation 316, the computing system engages the autonomous controller associated with the vehicle 102. The autonomous controller may control operation of the vehicle 102 through the environment 304, such as to a destination associated with the vehicle, for a designated time associated with a simulation, or the like.

Figure 4:
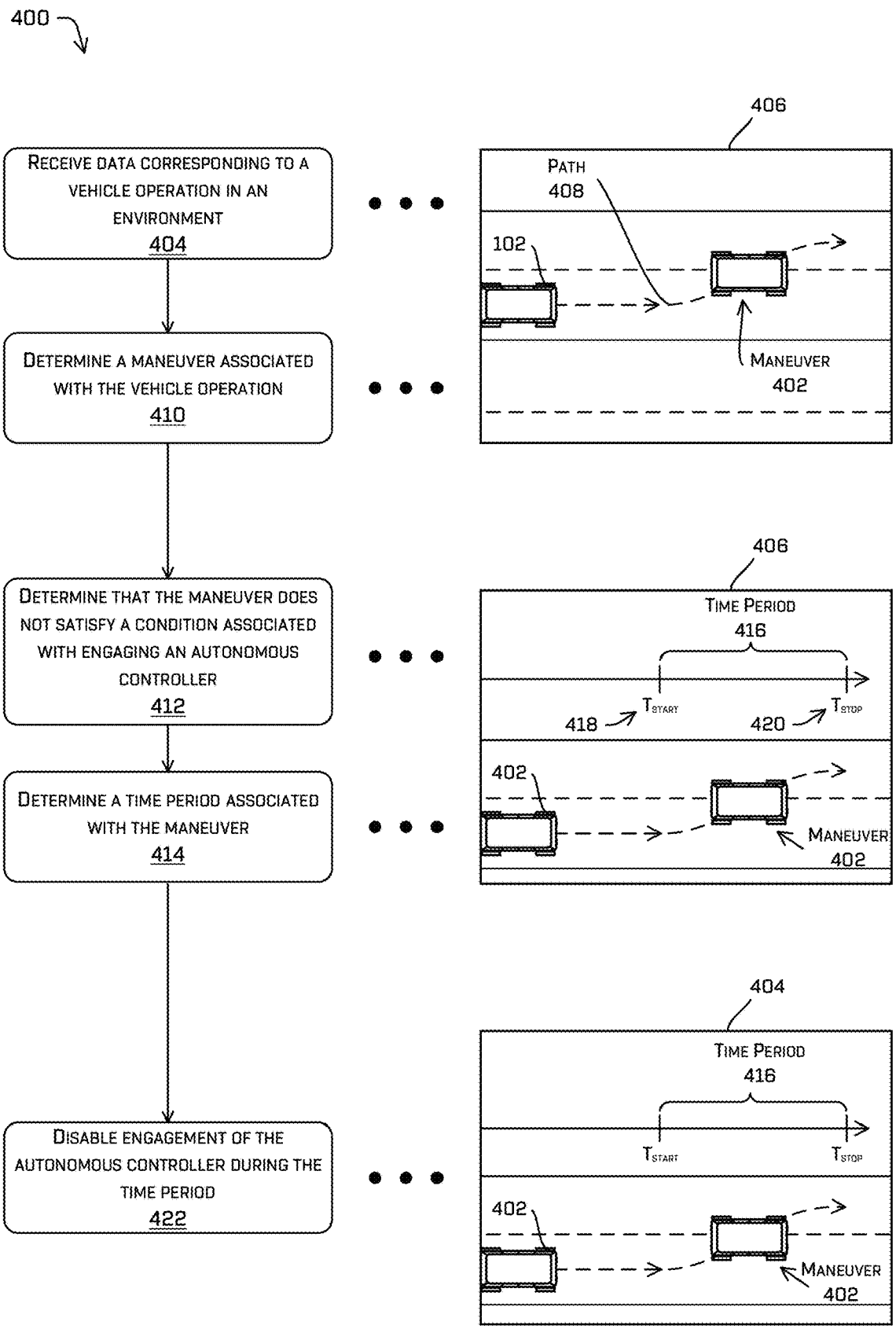
FIG. 4 illustrates a process for determining to disable an engagement of an autonomous controller of a vehicle based on a maneuver associated with vehicle operation, in accordance with examples of this disclosure.

FIG. 4 illustrates a process 400 for determining to disable an engagement of an autonomous controller of a vehicle 102 during a period of time based on a maneuver 402 associated with vehicle operation, in accordance with examples of this disclosure. In various examples, a simulation computing system may determine to disable the engagement of the autonomous controller associated with the vehicle 102 while running a simulation, such as a simulation generated to test a function of the autonomous controller. In such examples, the simulation computing system may prevent the autonomous controller from controlling the vehicle 102.

At operation 404, the computing device (e.g., simulation computing device) may receive data corresponding to the vehicle operation in an environment 406, such as environment 100. The data may include historical data associated with a previous operation of the vehicle 102, such as the vehicle traveling from an initial location along a path 408 to a destination. In some examples, the data may include sensor data captured by one or more sensors on the vehicle and/or one or more remote sensors (e.g., on another vehicle, mounted in the environment, etc.), map data (e.g., one or more road segments associated with the environment and/or a vehicle path there through), determined actions by which a controller (e.g., operator, a first autonomous controller associated with the historical data, etc.) controlled the vehicle 102 through the environment 406, times associated with the actions, and the like.

In some examples, the computing system may be configured to generate a simulation associated with vehicle 102 operations based on the data, such as for evaluating performance of a second autonomous controller. The evaluation of the autonomous controller may be used to confirm proper algorithmic behavior thereof. For example, the computing system may generate the simulation to test the efficacy of an autonomous controller that has been updated, to ensure safe operation thereof in various environments prior to utilizing the autonomous controller in the vehicle itself.

At operation 410, the computing device may determine the maneuver 402 associated with the vehicle operation, such as maneuver 122. The maneuver 402 such as maneuver 122. The maneuver may be associated with movement of the vehicle, such a lane change, staying in a lane, going around an obstacle (e.g., double-parked vehicle, traffic cones, etc.), turning, transitioning through a junction, merging, a speed variation (e.g., maintain velocity, accelerate, decelerate, etc.), a positional variation (e.g., changing a position in a lane), or the like. In various examples, the computing system may determine the maneuver 402 based on the vehicle path 408, a vehicle trajectory associated therewith, and/or one or more locations associated with the maneuver 402 (e.g., location of the vehicle 102 during the maneuver). For example, the computing system may determine that the maneuver 402 includes a lane change maneuver the vehicle 102 conducted while traveling through the environment.

At operation 412, the computing device determines that the maneuver 402 does not satisfy a condition associated with engaging an autonomous controller (e.g., an autonomous control condition). The condition may include that the vehicle 102 is operating in a single lane (e.g., not changing lanes, not maneuvering around an obstacle, etc.), is clear of junctions (e.g., not transitioning through a junction), and/or is operating on a road segment associated with map data. In at least one example, the autonomous control condition may include a condition that a state of the vehicle remains constant (e.g., continue in lane) during the maneuver 402. In some examples, at least because the computing system determines a state change associated with the lane change maneuver 402, the computing system determines that the maneuver 402 does not satisfy the condition associated with engaging an autonomous controller.

At operation 414, the computing device determines a time period 416 associated with the maneuver. In various examples, the time period 416 may be defined by a start time 418 and a stop time 420 associated with the maneuver 402. A start time 418 associated the maneuver 402 may include a time at which the first controller (e.g., a first autonomous controller, the operator, etc.) instructs a drive system to modify a vehicle trajectory of the vehicle 102 and/or a time buffer (e.g., 0.1 seconds prior to the start of the maneuver 402). In various examples, the computing system may determine the stop time 420 associated with the maneuver 402 based on a time at which the first controller instructs the drive system to modify the vehicle trajectory to correspond to a different maneuver that satisfies the condition(s)) (e.g., constant state of operation) and/or an additional time buffer (e.g., 0.2 seconds after the end of the maneuver 402). For example, a start time 418 may be associated with an initial movement of the vehicle 102 toward an adjacent lane during the lane change maneuver 402 and a stop time 420 may be associated with a completion of the maneuver 402 in which the vehicle 102 operates in a direction of travel that is substantially parallel with a direction associated with the adjacent lane.

As discussed above, a vehicle computing system of the vehicle 102 may determine, in real-time or near real-time that the maneuver 402 does not satisfy the condition, such as because the maneuver 402 is associated with a state change. In various examples, the vehicle computing system may store data associated with the maneuver 402, such as the time period 416 associated therewith (e.g., the start time 418 and the stop time 420), the condition that is not satisfied, a description of the maneuver 402 (e.g., turn, lane change, operation in a junction, etc.), and the like. The vehicle computing system may provide the data associated with the maneuver 402 to the simulation computing device, such as pre-processed data corresponding to maneuvers 402 that fail to satisfy the condition and/or periods of time associated with disabling an engagement of an autonomous controller. In some examples, the simulation computing system may utilize the pre-processed data associated with the maneuvers 402 to determine an engagement time of a second autonomous controller in the simulation. In such examples, the engagement time may include a time that is not associated with the time period 416 (e.g., before the start time 418 or after the stop time 420).

At operation 422, the computing system disables engagement of the autonomous controller during the time period 416. In various examples, the computing system may automatically deny a request to engage the autonomous mode received during the time period 416, such as without performing additional processing to determine whether the maneuver 402 satisfies the condition. In further examples, one or more indications (such as timestamps) may be provided to log data or otherwise flagged such that future simulations based off of such log data may be precluded from engaging autonomy in those periods.

Figure 5:
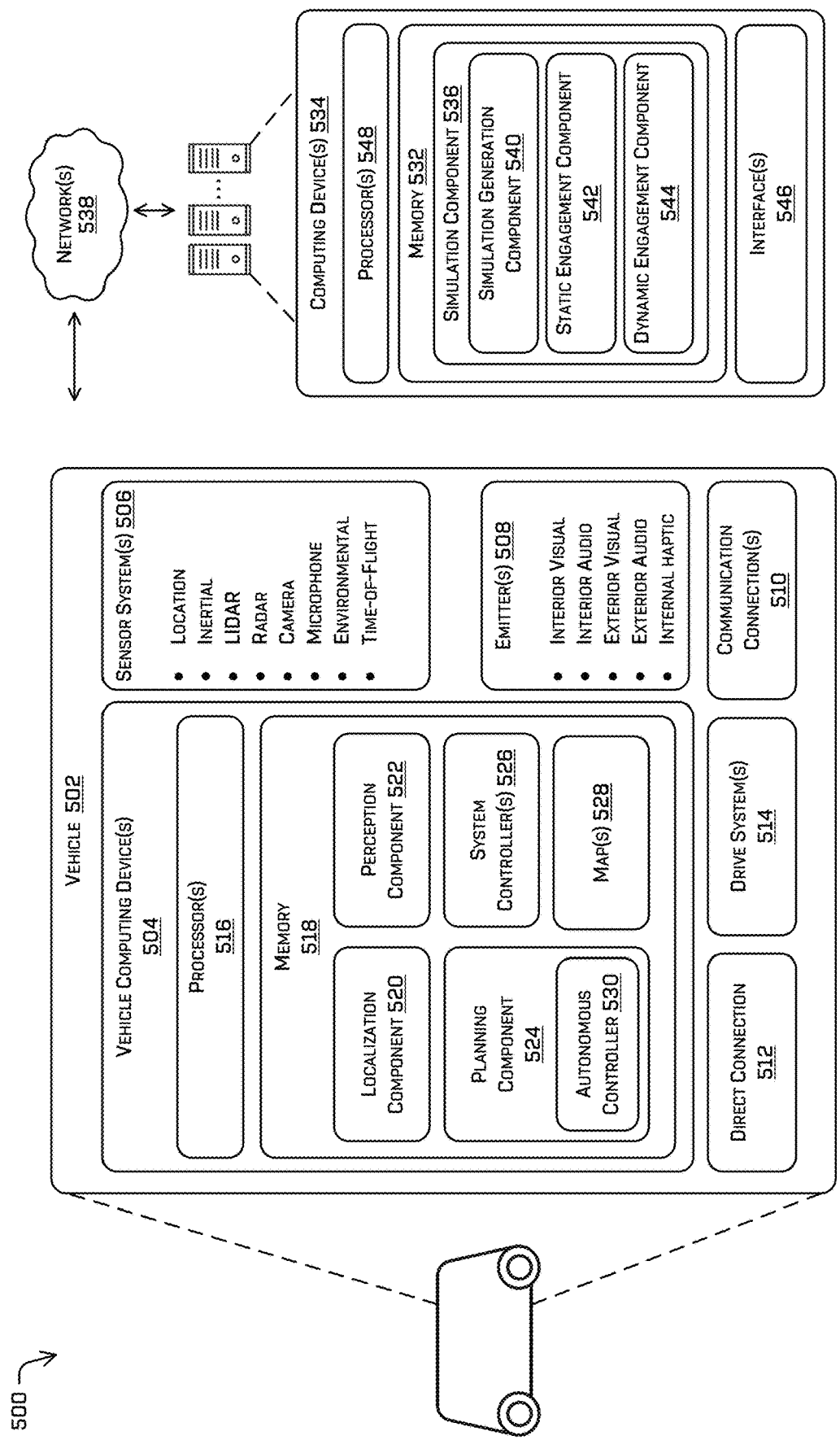
FIG. 5 is a block diagram of an example system for implementing the techniques described herein.

FIG. 5 is a block diagram of an example system 500 for implementing the techniques described herein. In at least one example, the system 500 may include a vehicle 502, such as the vehicle 102 of FIG. 1.

The vehicle 502 may include one or more vehicle computing devices 504, one or more sensor systems 506, one or more emitters 508, one or more communication connections 510, at least one direct connection 512, and one or more drive systems 514.

The vehicle computing device(s) 504 may include one or more processors 516 and memory 518 communicatively coupled with the one or more processors 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In the illustrated example, the memory 518 of the vehicle computing device(s) 504 stores a localization component 520, a perception component 522, a planning component 524 including an autonomous controller 530, one or more system controllers 526, and one or more maps 528. Though depicted in FIG. 5 as residing in the memory 518 for illustrative purposes, it is contemplated that the localization component 520, a perception component 522, a planning component 524, one or more system controllers 526, one or more maps 528, and the autonomous controller 530 may additionally, or alternatively, be accessible to the vehicle 502 (e.g., stored on, or otherwise accessible by, memory remote from the vehicle 502, such as, for example, on memory 532 of one or more computing devices 534). For example, the memory 532 may store a simulation component 536 accessible by the planning component 524 of the vehicle 502. In at least one example, the simulation component 536 may configure the computing device 534 as a simulation computing system, such as that described above.

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 528, and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, nonlinear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some examples, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planning component 524 may determine a path for the vehicle 502 to follow to traverse through an environment, such as while operating in an autonomous mode (e.g., as controlled by a first autonomous controller 530, as described herein). For example, the planning component 524 may determine various routes and vehicle trajectories and various levels of detail. For example, the planning component 524 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 524 may generate an instruction for guiding the autonomous vehicle 502 along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a vehicle trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate. Though illustrated as being a component of the planning component 524, the autonomous controller 530 may include a controller configured to perform the functions of one or more of the localization component 520, perception component 522, and planning component 524 of the vehicle computing device(s) 504. In other words, the autonomous controller 530 may be configured to control the vehicle 502.

In at least one example, the vehicle computing device(s) 504 may include one or more system controllers 526, which may be configured to control steering, propulsion, braking, safety, emitters, communication, and other systems of the vehicle 502. The system controller(s) 526 may communicate with and/or control corresponding systems of the drive system(s) 514 and/or other components of the vehicle 502.

The memory 518 may further include one or more maps 528 that may be used by the vehicle 502 to navigate within the environment, such as those included in the map data described above. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 528. That is, the map(s) 528 may be used in connection with the localization component 520, the perception component 522, and/or the planning component 524 to determine a location of the vehicle 502, determine whether a maneuver of the vehicle 502 satisfies a condition associated with engagement of the autonomous controller, detect objects in an environment, generate routes, determine actions and/or trajectories to navigate within an environment.

In some examples, the one or more maps 528 may be stored on a remote computing device(s) (such as the computing device(s) 534) accessible via one or more networks 538. In some examples, multiple maps 528 may be stored based on, for example, a characteristic (e.g., type of entity, time of day, day of week, season of the year, etc.). Storing multiple maps 528 may have similar memory requirements but increase the speed at which data in a map may be accessed.

As can be understood, the components discussed herein (e.g., the localization component 520, the perception component 522, the planning component 524, the one or more system controllers 526, the one or more maps 528 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 518 (and the memory 532, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

As illustrated, the computing device(s) 534 may include a simulation component 536. Though not illustrated, the vehicle computing device(s) 504 may additionally or alternatively include the simulation component 536. The simulation components 536 may be configured to generate simulations for evaluating a performance of an autonomous controller, such as, for example, an update to the autonomous controller 530. As discussed above, the simulation component 536 may be configured to determine an initialization time associated with the simulation, a run time (e.g., duration of the simulation), a particular scenario to be tested, a duration after an action associated with the scenario is taken, and/or, in some examples, an engagement time of the autonomous controller to be tested. Though the simulation component 536 is illustrated as including additional components, such as simulation generation component 540, the static engagement component 542, and the dynamic engagement component 544, the vehicle computing device(s) 504 may also include at least a dynamic engagement component 544. In some examples, the vehicle computing device(s) 504 may include a simulation generation component 540, such as to generate simulations to test an autonomous controller 530 and/or an update thereto during vehicle operation, such as with real-time and/or near real-time data.

The simulation component 536 may include a simulation generation component 540. The simulation generation component 540 may be configured to generate one or more simulations utilizing historical data of vehicle 502 operations. In at least one examples, the simulation generation component 540 may be configured to generate a plurality of simulations associated with the operations of a plurality of vehicles 502 (e.g., a fleet of vehicles 502). As discussed above, the data may include sensor data captured by one or more sensors 506 on the vehicle and/or one or more remote sensors (e.g., on another vehicle 502, mounted in the environment, etc.), map data (e.g., one or more road segments associated with the environment and/or a vehicle path there through), determined actions by which a controller (e.g., operator, autonomous controller 530, etc.) controlled the vehicle 502 through the environment, times associated with the actions, and the like.

In various examples, the static engagement component 542 may be configured to receive data corresponding to a historical operation of the vehicle 502, such as from the vehicle computing device 504. The static engagement component 542 may be configured to determine one or more maneuvers that fail to satisfy one or more conditions associated with autonomy engagement. The static engagement component 542 may determine a time period (e.g., a start and a stop time) associated with each maneuver of the maneuver(s). In some examples, the static engagement component may determine to disable an engagement of an autonomous controller during the time period(s) associated with the maneuver(s). In various examples, the static engagement component may provide the data associated with the maneuver(s) (e.g., time period, condition not satisfied, etc.) to the dynamic engagement component 544, such as to prevent engagement of the autonomous controller during the time periods.

In various examples, the dynamic engagement component 544 may be configured to receive a request to engage an autonomous controller, such as autonomous controller 530 (e.g., a first autonomous controller on a vehicle 502) or a second autonomous controller being tested by the simulation component 536. The request may be received from an operator of the vehicle 502 and/or from the simulation component 536 itself. In some examples, the request may be sent based on a pre-determined time corresponding to testing the autonomous controller, such as that stored in association with the simulation component 536 and/or the simulation generation component 540. In such examples, the pre-determined time may include a programmed initialization time for multiple simulations, such as to ensure that results associated with each of the multiple simulations are comparable to one another.

The dynamic engagement component 544 may determine a time corresponding to the request (e.g., time associated with receipt of the request). In various examples, the dynamic engagement component 544 may be configured to receive data from the static engagement component 542 indicating one or more periods associated with maneuvers that fail to satisfy the condition(s) for autonomy engagement. In some examples, the dynamic engagement component 544 may determine whether the time associated with the request corresponds to one of the one or more periods. Based on a response that the time corresponds to the one or more periods, the dynamic engagement component 544 may determine to not engage the autonomous controller. In various examples, the dynamic engagement component 544 may provide a notification to an operator, such as via an interface 546.

In various examples, the dynamic engagement component 544 may be configured to determine a maneuver associated with the time. As discussed above, the maneuver may include a lane change, staying in a lane, going around an obstacle (e.g., double-parked vehicle, traffic cones, etc.), turning, transitioning through a junction, merging, a speed variation (e.g., maintain velocity, accelerate, decelerate, etc.), a positional variation (e.g., changing a position in a lane), or the like. In various examples, the dynamic engagement component 544 may be configured to determine whether the maneuver satisfies the condition(s) associated with autonomy engagement. Based on a determination that the maneuver satisfies the condition(s), the dynamic engagement component 544 may engage the autonomous controller. For example, an operator of the vehicle 502 may submit the request during a manual or semi-autonomous operation of the vehicle 502, such as via an interface associated therewith (e.g., an interface 546 of the vehicle 502). Based on a determination a maneuver associated with the time of the request satisfies the condition(s), the dynamic engagement component 544 may engage the autonomous controller 530. For another example, the dynamic engagement component 544 may receive the request based on a pre-determined engagement time of the autonomous controller in a simulation. The dynamic engagement component 544 may determine whether a maneuver associated with the engagement time satisfies the condition(s). Based on a determination that the maneuver satisfies the condition(s), the dynamic engagement component 544 may engage the autonomous controller in the simulation.

Based on a determination that the maneuver associated with the time corresponding to the request does not satisfy the condition(s), the dynamic engagement component 544 may determine to disable an engagement of the autonomous controller. Disabling the engagement of the autonomous controller may prevent the autonomous controller to be engaged at the time, either in real-time or near real-time operation of the vehicle 502 and/or in the simulation. In some examples, responsive to a determination to not engage the autonomous controller, the dynamic engagement component 544 may cause a notification to be presented to an operator of the vehicle 502 and/or the simulation. In some examples, the dynamic engagement component 544 may cause the notification to be stored in association with vehicular operation and/or simulation operation. For example, data associated with the unsuccessful attempt to engage the autonomous controller may be stored in a data store associated with the vehicle computing device 504 and/or the computing device 534.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device(s) 504. Additionally or in the alternative, the sensor system(s) 506 may send sensor data, via the one or more networks 538, to the one or more computing device(s) 534 at a particular frequency, after a lapse of a predetermined period of time, in near real-time, etc.

The vehicle 502 may also include one or more emitters 508 for emitting light and/or sound. The emitters 508 may include interior audio and visual emitters to communicate with passengers of the vehicle 402. In some examples, the emitters 508 may include interior audio, visual and/or haptic emitters configured to alert an operator of an unsuccessful attempt at engaging autonomous mode. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., computing device(s) 534, other nearby vehicles, etc.).

The communications connection(s) 510 may include physical and/or logical interfaces for connecting the vehicle computing device(s) 504 to another computing device or a network, such as network(s) 538. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s) 534.

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more systems to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the planning component 524, the one or more system controllers 526, the one or more maps 528, and the autonomous controller 530, may process data (e.g., sensor data, simulation data), as described above, and may send their respective outputs, over the one or more network(s) 538, to the computing device(s) 534. In at least one example, the localization component 520, the perception component 522, the planning component 524, the one or more system controllers 526, the one or more maps 528, and the autonomous controller 530, may send their respective outputs to the computing device(s) 534 at a particular frequency, after a lapse of a predetermined period of time, in near real-time, etc.

In some examples, the vehicle 502 may send sensor data to the computing device(s) 534 via the network(s) 538. In some examples, the vehicle 502 may receive sensor data from the computing device(s) 534 and/or one or more remote sensor systems via the network(s) 538. The sensor data may include raw sensor data and/or processed sensor data and/or representations of sensor data. In some examples, the sensor data (raw or processed) may be sent and/or received as one or more log files.

The computing device(s) 534 may include one or more processors 548 and a memory 532 storing the simulation component 536. The processor(s) 516 of the vehicle 502 and the processor(s) 548 of the computing device(s) 534 may be any suitable processor capable of executing instructions to process data and perform operations as described herein. By way of example and not limitation, the processor(s) 516 and 548 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and 532 are examples of non-transitory computer-readable media. The memory 518 and 532 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518 and 532 may include at least a working memory and a storage memory. For example, the working memory may be a high-speed memory of limited capacity (e.g., cache memory) that is used for storing data to be operated on by the processor(s) 516 and 548. In some instances, the memory 518 and 532 may include a storage memory that may be a lower-speed memory of relatively large capacity that is used for long-term storage of data. In some cases, the processor(s) 516 and 548 cannot operate directly on data that is stored in the storage memory, and data may need to be loaded into a working memory for performing operations based on the data, as discussed herein.

It should be noted that while FIG. 5 is illustrated as a distributed system, in alternative examples, components of the vehicle 502 may be associated with the computing device(s) 534 and/or components of the computing device(s) 534 may be associated with the vehicle 502. That is, the vehicle 502 may perform one or more of the functions associated with the computing device(s) 534, and vice versa.

FIGS. 6-9 illustrate example processes in accordance with examples of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 6:
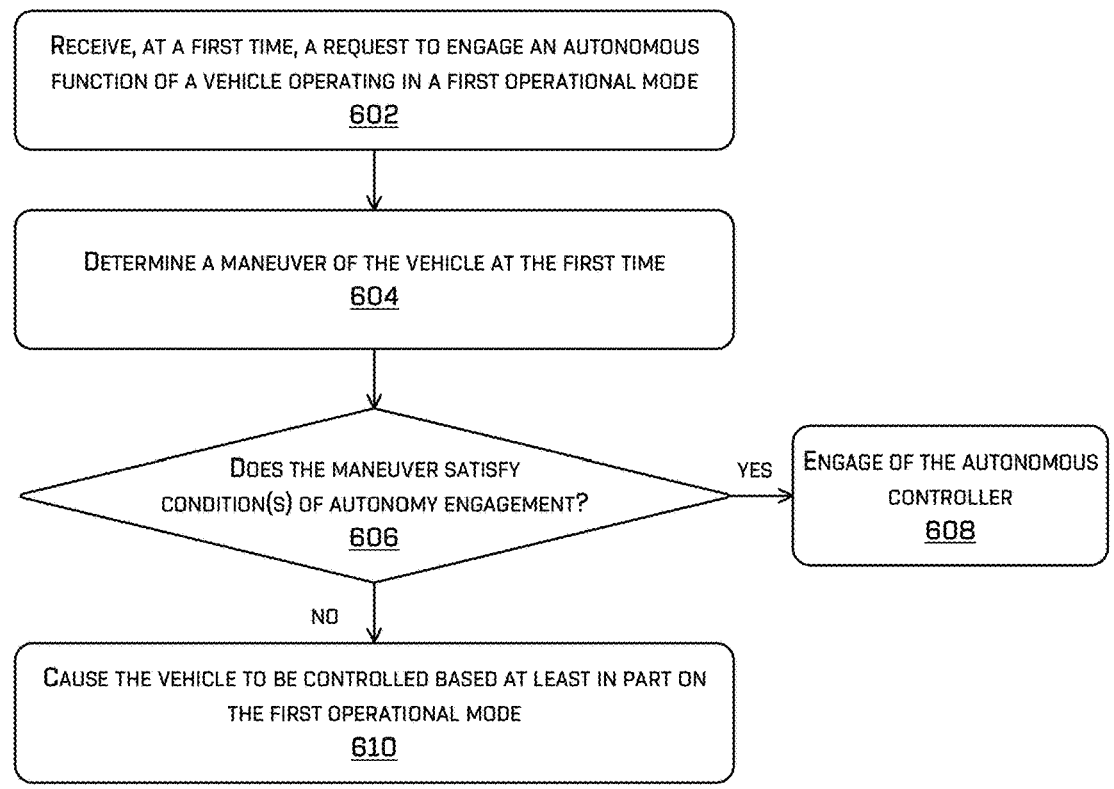
FIG. 6 depicts an example process for determining whether to enable engagement of an autonomous function of a vehicle based on a state of the vehicle, in accordance with examples of this disclosure.

FIG. 6 depicts an example process 600 for determining whether to enable engagement of an autonomous function of a vehicle based on a state of the vehicle. Some or all of the process 600 may be performed by one or more components in FIG. 5, as described herein. For example, some or all of the process 600 may be performed by the vehicle computing device(s) 504 and/or computing device(s) 534.

At operation 602, the process 600 includes receiving, at a first time, a request to engage an autonomous controller of a vehicle operating in a first operational mode. In various examples, the first operational mode may include an autonomous mode controlled by a first autonomous controller. In such examples, the request to engage the autonomous controller may include a request to engage a second autonomous controller. In various examples, the first operational mode may include a manual mode and/or a semi-autonomous mode of the vehicle.

In some examples, the request to engage the autonomous controller may be received based on user input via an interface associated with the vehicle. The interface may include an interface configured to enable one or more levels of autonomy in a vehicle operating in real-time or near real-time in the environment. In various examples, the user input may be received via an interface of a simulation computing device, such as to engage an autonomous controller to be tested in the simulation generated utilizing historical data associated with a previous vehicle operation through the environment.

At operation 604, the process 600 includes determining a maneuver of the vehicle at the first time. The maneuver may represent a movement of the vehicle at the first time, such a lane change, staying in a lane, going around an obstacle (e.g., double-parked vehicle, traffic cones, etc.), turning, transitioning through a junction, merging, a speed variation (e.g., maintain velocity, accelerate, decelerate, etc.), a positional variation (e.g., changing a position in a lane), or the like. In various examples, the computing system may determine the maneuver based on a vehicle trajectory associated with the vehicle and/or a location of the vehicle at the first time. For example, the computing system may determine that the maneuver includes accelerating from a stopped position associated with a stop sign through a junction.

At operation 606, the process 600 includes determining whether the maneuver satisfies one or more conditions of autonomy engagement. The condition(s) may include that the vehicle is operating in a single lane (e.g., not changing lanes, not maneuvering around an obstacle, etc.), is clear of junctions (e.g., not transitioning through a junction), and/or is operating on a road segment associated with map data. In at least one example, the condition(s) may include a condition that a state of the vehicle remains constant (e.g., not in transitory state between lanes, in a junction, etc.) during the maneuver.

Based on a determination that the maneuver satisfies the condition(s) of autonomy engagement ("Yes" at operation 606), the process 600, at operation 608 includes engaging of the autonomous controller. In examples of real-time and/or near real-time operation of the vehicle, the autonomous controller may control the vehicle from a location associated with engagement of the autonomous controller along a vehicle path to another location in the environment, such as a destination. In examples of a simulation of vehicle operation, the autonomous controller (e.g., second autonomous controller) may control an operation of the vehicle based on the historical data processed by the vehicle during operation (e.g., based on captured sensor data).

In some examples, the (simulation) computing system may be configured to determine one or more predicted trajectories of objects detected in the environment, utilizing the techniques described above, such as a top-down representation of the environment, probabilistic heat maps, tree search methods, temporal logic formulae, and/or machine learning techniques described in U.S. Pat. No. 10,671,076 and U.S. patent application Ser. Nos. 15/807,521, 16/151,607, and 16/504,147, each of which is incorporated herein by reference above. Additionally, the computing system may be configured to generate a simulation configured to receive user input with respect to the one or more objects, such as utilizing the techniques described in U.S. patent application Ser. No. 16/555,988, filed Aug. 29, 2019 and entitled "Vehicle Controller Simulations," the entire contents of which are incorporated herein by reference. Additionally, the computing system may be configured to control the objects in the environment, such as based on predictive technologies or other techniques. Accordingly, the autonomous controller may control the vehicle through a simulated environment including computer controlled and/or user-controlled objects.

Based on a determination that the maneuver does not satisfy the condition(s) of autonomy engagement ("No" at operation 606), the process 600, at operation 610, includes causing the vehicle to be controlled based at least in part on the first operational mode. In some examples, the computing system may store an indication of the failed engagement of the autonomous controller. In various examples, the computing system may cause a notification of the failed engagement of the autonomous controller to be presented to an operator of the vehicle and/or an operator of the simulation. As discussed above, the notification may include a visual notification (e.g., flashing light, solid light, pop-up notification via a user interface, etc.), an aural signal, a haptic signal, and/or any other type of notification usable to indicate to an operator that the engagement of the autonomous controller was not successful.

Figure 7:
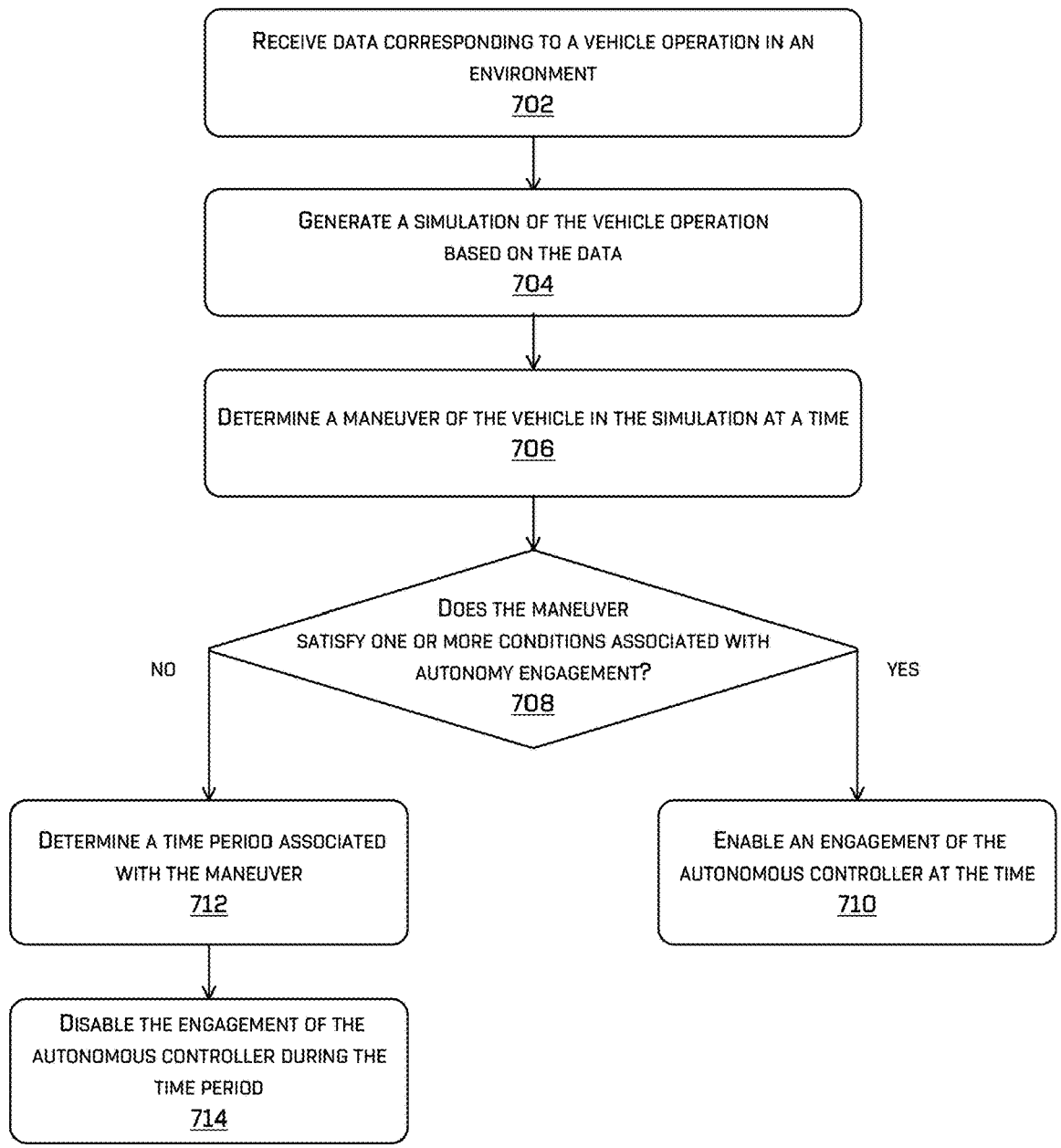
FIG. 7 depicts an example process for generating a simulation for testing different versions of an autonomous controller, in accordance with examples of this disclosure.

FIG. 7 depicts an example process 700 for generating a simulation for testing different versions of an autonomous controller. Some or all of the process 700 may be performed by one or more components in FIG. 5, as described herein. For example, some or all of the process 700 may be performed by the computing device(s) 534.

At operation 702, the process 700 includes receiving data corresponding to a vehicle operation in an environment. In various examples, the data may correspond to a historical operation of the vehicle, such as at a time prior to the time the data is received. In some examples, the computing system may receive the data in real-time and/or near real-time.

The data may include sensor data captured by one or more sensors on the vehicle and/or one or more remote sensors (e.g., on another vehicle, mounted in the environment, etc.), map data (e.g., one or more road segments associated with the environment and/or a vehicle path there through), determined actions by which a controller (e.g., operator, active autonomous controller, etc.) controlled the vehicle through the environment, times associated with the actions, and the like. As discussed above, in some examples, the data may include one or more time periods (e.g., start time, stop time, etc.) associated with maneuvers of the vehicle that fail to satisfy one or more conditions of autonomy engagement. In such examples, the time period(s) may represent pre-processed data configured to enable the computing system to quickly determine an engagement time associated with engaging the autonomous controller (e.g., a second autonomous controller) in the simulation. The pre-processed data may reduce an amount of processing that the simulation computing system performs on the data in association with generating the simulation. Accordingly, the techniques described herein may improve the functioning of the simulation computing system by reducing an amount of processing power and/or memory required thereby to determine the engagement time and/or determine time periods associated with disabling engagement of the autonomous controller.

At operation 704, the process 700 includes generating a simulation of the vehicle operation based on the data. In various examples, the simulation may be generated to evaluate a performance of an autonomous controller. The evaluation of the autonomous controller may be used to confirm proper algorithmic behavior thereof. For example, the computing system may generate the simulation to evaluate the efficacy of an autonomous controller that has been updated, to ensure safe operation thereof in various environments prior to utilizing the autonomous controller in the vehicle itself. In various examples, the computing system may generate simulations utilizing techniques such as those described in U.S. patent application Ser. No. 16/376,842, incorporated herein by reference above.

At operation 706, the process 700 includes determining a maneuver of the vehicle in the simulation at a time. The maneuver may represent a movement of the vehicle at a particular time, such a lane change, staying in a lane, going around an obstacle (e.g., double-parked vehicle, traffic cones, etc.), turning, transitioning through a junction, merging, a speed variation (e.g., maintain velocity, accelerate, decelerate, etc.), a positional variation (e.g., changing a position in a lane), or the like. In various examples, the computing system may determine the maneuver based on a vehicle trajectory associated with the vehicle and/or a location of the vehicle at the particular time. For example, the computing system may determine that the maneuver includes traveling in a consistent position in a lane.

At operation 708, the process 700 includes determining whether the maneuver satisfies one or more conditions of autonomy engagement. The condition(s) may include that the vehicle is operating in a single lane (e.g., not changing lanes, not maneuvering around an obstacle, etc.), is clear of junctions (e.g., not transitioning through a junction), and/or is operating on a road segment associated with map data. In at least one example, the condition(s) may include a condition that a state of the vehicle remains constant (e.g., not in transitory state between lanes, in a junction, etc.) during the maneuver.

Based on a determination that the maneuver satisfies the condition(s) ("Yes" at operation 708, the process, at operation 710, includes enabling an engagement of the autonomous at the time. In some examples, the computing system may store an indication that the autonomous controller may be activated (e.g., autonomous control engaged) at the time. In some examples, the computing system may determine an engagement time based on a determination that the maneuver satisfies the condition(s) at the time.

Based on a determination that the maneuver does not satisfy the condition(s) ("No" at operation 708), the process, at operation 712, determines a time period associated with the maneuver. As described above, the time period may include a start time and a stop time associated with the maneuver. The start time may include a time at which the first controller (e.g., the first autonomous controller, the operator, etc.) instructs a drive system to modify a vehicle trajectory of the vehicle to conduct the maneuver and/or a time buffer (e.g., 0.1 seconds prior to the start of the maneuver). In various examples, the stop time may include a time at which the first controller instructs the drive system to modify the vehicle trajectory to correspond to a second (different) maneuver that satisfies the condition(s) and/or an additional time buffer (e.g., 0.2 seconds after the end of the maneuver).

At operation 714, the process 700 includes disabling the engagement of the autonomous controller during the time period. In various examples, the computing system may store an indication of disabled engagement of the autonomous controller during the time period. As discussed above, the computing system may be configured to automatically determine to deny a request to engage the autonomous controller received during the time period, such as while the simulation is running, such as without performing additional processing to determine whether a maneuver associated with a time of the request satisfies the condition(s). In various examples, the computing system may utilize data associated with the time period and/or the disabled engagement of the autonomous controller to determine an engagement time of the autonomous controller. In some examples, the computing system may determine the engagement time to be a time not associated with the time period.

Figure 8:
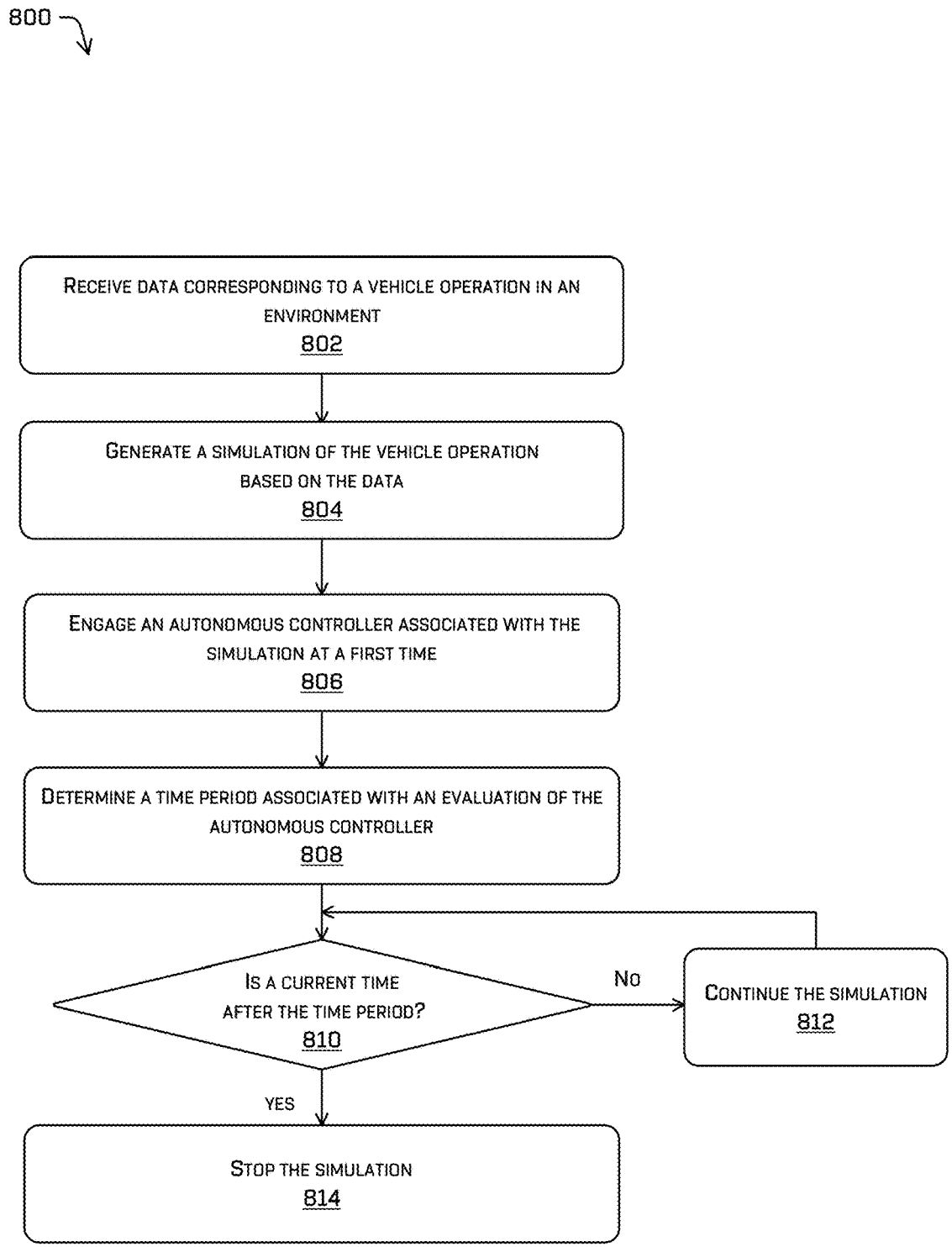
FIG. 8 depicts an example process for determining an end time associated with a simulation and stopping the simulation at the end time, in accordance with examples of this disclosure.

FIG. 8 depicts an example process 800 for determining an end time associated with a simulation and stopping the simulation at the end time. Some or all of the process 800 may be performed by one or more components in FIG. 5, as described herein. For example, some or all of the process 800 may be performed by the computing device(s) 534.

At operation 802, the process 800 includes receiving data corresponding to a vehicle operation in an environment. In various examples, the data may correspond to a historical operation of the vehicle, such as at a time prior to the time the data is received. In some examples, the computing system may receive the data in real-time and/or near real-time. As discussed above, the data may include sensor data captured by one or more sensors on the vehicle and/or one or more remote sensors, map data, determined actions by which a controller controlled the vehicle through the environment, times associated with the actions, and the like. As discussed above, in some examples, the data may include one or more time periods (e.g., start time, stop time, etc.) associated with maneuvers of the vehicle that fail to satisfy one or more conditions of autonomy engagement.

At operation 804, the process 800 includes generating a simulation of the vehicle operation based on the data. In various examples, the simulation may be generated to evaluate a performance of an autonomous controller. The evaluation of the autonomous controller may be used to confirm proper algorithmic behavior thereof. For example, the computing system may generate the simulation to evaluate the efficacy of an autonomous controller that has been updated, to ensure safe operation thereof in various environments prior to utilizing the autonomous controller in the vehicle itself. In various examples, the computing system may generate simulations utilizing techniques such as those described in U.S. patent application Ser. No. 16/376,842, incorporated herein by reference above.

At operation 806, the process 800 includes engaging an autonomous controller associated with the simulation at a first time (e.g., an engagement time). In various examples, the autonomous controller may be engaged based on a received request to engage the autonomous controller, such as from an operator or from a simulation component of the computing device. In some examples, the first time my include a programmed engagement time associated with the simulation. In some examples, the first time may include a determined engagement time, such as based on a determination that the first time includes a time that is associated with a maneuver that satisfies a condition of autonomy engagement.

At operation 808, the process 800 includes determining a time period associated with an evaluation of the autonomous controller. In some examples, the computing system may generate one or more simulations with a pre-determined time period, such as to run the simulation(s) for a same amount of time (e.g., 5 seconds, 10 seconds, etc.). In such examples, a performance of autonomous controller may be evaluated for across the simulation(s) for the period of time, such as to determine whether the autonomous controller controls the vehicle as expected.

In some examples, the simulation may be generated to evaluate a performance of the autonomous controller with respect to a particular scenario. In some examples, the computing system may run the simulation from the engagement time until autonomous controller determines an action to take with respect to the particular scenario. In such examples, computing system may determine a time associated with the action (e.g., timestamp at which the autonomous controller determines the action to take in the scenario). The time period may include a period of time between the engagement time and the time associated with the action.

In some example, the time period may include a period of time from the engagement time until the time associated with an action determination plus a time buffer (e.g., 0.5 seconds, 1 second, etc.). In some examples, the time buffer may include a period of time sufficient to evaluate the determined action, such as to determine a divergence between the simulated vehicle controlled by the autonomous controller and the historical data corresponding to the previous action of the vehicle, a rate of divergence (e.g., how rapidly the respective locations and/or paths diverge), and/or to determine little to no divergence between the vehicle controlled by the autonomous controller and what the vehicle actually did (e.g., confirm the second autonomous controller performs similarly to a first autonomous controller (e.g., a previous version of the autonomous controller) in the particular scenario). In some examples, the divergence may include a threshold divergence (e.g., distance between the vehicle and the simulated vehicle is 10 feet, 5 meters, etc.). In such examples, an end time may be determined based on a time associated with determining that the distance between the vehicle and the simulated vehicle is at least a threshold distance.

At operation 810, the process 800 includes determining whether a current time is after the time period. In some examples, the computing system may determine whether the current time is before, at or after an end time associated with the time period (e.g., the time associated with the determined action plus a time buffer, time associated with a threshold divergence determination, etc.).

Based on a determination that the current time during the time period (e.g., prior to the time associated with the action and/or the time buffer) ("No" at operation 810), the process, at operation 812, includes continuing the simulation. The computing system may continue the simulation until the current time is after the time period.

Based on a determination that the current time is after the time period ("Yes" at operation 810), the process, at operation 814, includes stopping the simulation.

Figure 9:
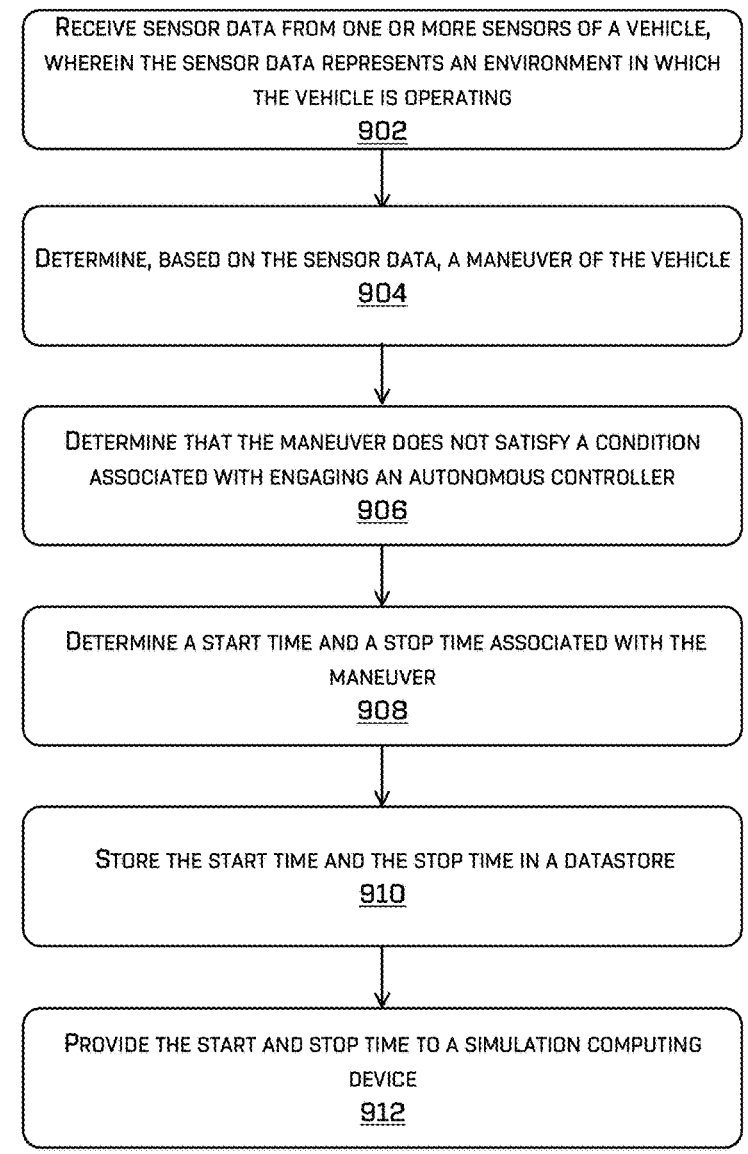
FIG. 9 depicts an example process for providing data associated with maneuvers of a vehicle to a simulation computing device, in accordance with examples of this disclosure.

FIG. 9 depicts an example process 900 for providing data associated with maneuvers of a vehicle to a simulation computing device. Some or all of the process 900 may be performed by one or more components of FIG. 5, as described herein. For example, some or all of the process 900 may be performed by the vehicle computing device 504.

At operation 902, the process 900 includes receiving sensor data from one or more sensors of a vehicle, wherein the sensor data represents an environment in which the vehicle is operating. The sensor data may correspond to the vehicle operation in an autonomous mode (e.g., by a first autonomous controller) or in a manual or semi-autonomous mode. During operation, the vehicle may receive the sensor data from the sensor(s) in real-time and/or near real-time. In various examples, the vehicle computing system may receive sensor data from one or more remote sensors, such as sensors located on another vehicle and/or sensors mounted in the environment. In some examples, the vehicle computing system may receive map data, such as data associated with one or more maps corresponding to the environment, such as map(s) 528 of FIG. 5.

At operation 904, the process 900 includes determining, based on the sensor data, a maneuver of the vehicle. As discussed above, the maneuver of the vehicle may be associated with movement of the vehicle, such a lane change, staying in a lane, going around an obstacle, turning, transitioning through a junction, merging, a speed variation, a positional variation, or the like. In some examples, the vehicle computing system may determine a location of the vehicle associated with the maneuver based on the sensor data, such as utilizing SLAM or other techniques described above.

At operation 906, the process 900 includes determining that the maneuver does not satisfy a condition associated with engaging an autonomous controller. In various examples, the condition may include that the vehicle is operating in a single lane (e.g., not changing lanes, not maneuvering around an obstacle, etc.), is clear of junctions (e.g., not transitioning through a junction), and/or is operating on a road segment associated with map data. In at least one example, the autonomous control condition may include a condition that a state of the vehicle remains constant during the maneuver.

At operation 908, the process 900 includes determining a start and a stop time associated with the maneuver. The start time may include a time at which a first controller (e.g., the first autonomous controller, the operator, etc.) instructs a drive system to modify a vehicle trajectory of the vehicle to conduct the maneuver and/or a time buffer (e.g., 0.1 seconds prior to the start of the maneuver). In various examples, the stop time may include a time at which the first controller instructs the drive system to modify the vehicle trajectory to correspond to a second (different) maneuver that satisfies the condition(s) and/or an additional time buffer (e.g., 0.2 seconds after the end of the maneuver).

At operation 910, the process 900 includes storing the start and the stop time in a datastore, or otherwise providing a flag in the datastore associated with stored data indicative of the time. In various examples, the vehicle computing system may store the start and the stop time in the database in association with the maneuver that does not satisfy the condition, such as pre-processed data associated with times in which to not engage an autonomous controller.

At operation 912, the process 900 includes providing the start and the stop time to a simulation computing device, such as computing device 534 of FIG. 5. In various examples, the start and the stop time may be included in the data provided to the simulation computing device, such as for generating a simulation utilizing historical data corresponding to a previous operation of the vehicle.

Example Clauses

A: A system comprising: one or more processors; and memory storing processor-executable instructions that, when executed by the one or more processors, configure the system to: receive data associated with a vehicle, wherein the data is associated with an operation of the vehicle in a first operational mode, wherein the first operational mode comprises at least one of: a manual control of the vehicle; a semi-autonomous control of the vehicle; or an autonomous control of the vehicle by a first autonomous controller; receive, at a first time, a request to engage a second operational mode of the vehicle, wherein the second operational mode is different than the first operational mode and comprises at least one of: the autonomous control of the vehicle by the first autonomous controller; or the autonomous control of the vehicle by a second autonomous controller; determine, based at least in part on the data, a maneuver of the vehicle associated with the first time; determine that the maneuver fails to satisfy a condition associated with an engagement of the second operational mode; and disable the engagement of the second operational mode, wherein a disabled engagement of the second operational mode causes the vehicle to continue operating according to the first operational mode.

B: The system of paragraph A, wherein the request is a first request, the maneuver is a first maneuver, and the instructions further configure the one or more processors to: receive, at a second time, a second request to engage the second operational mode of the vehicle; determine a second maneuver of the vehicle associated with the second time; determine that the second maneuver satisfies the condition; and cause the vehicle to be controlled vehicle according to the second operational mode C: The system of either paragraph A or paragraph B, wherein the instructions further configure the one or more processors to: generate a simulation based at least in part on the data; and determine a time period associated with the maneuver, wherein the first time is associated with the time period, wherein disabling the engagement is based at least in part on a determination that the first time is associated with the time period D: The system of any one of paragraphs A-C, wherein the request to engage the second operational mode is received from: a simulation computing device; or a vehicle computing device E: The system of any one of paragraphs A-D, wherein the maneuver comprises at least one of: a lane change; a transition through a junction; or a deviation from a vehicle path associated with traveling around an obstacle F: A method comprising: receiving data associated with an operation of a vehicle through an environment, in accordance with a first operational mode; receiving, at a first time, a request to engage a second operational mode of the vehicle which is different than the first operational mode; determining, based at least in part on the data, a state of the vehicle at the first time; determining that the state fails to satisfy a condition associated with an engagement of the second operational mode; and disabling the engagement of the second operational mode, wherein a disabled engagement of the second operational mode causes the vehicle to continue operating according to the first operational mode G: The method of paragraph F, wherein the request is a first request, and the state is a first state, the method further comprising: receiving, at a second time, a second request to engage the second operational mode of the vehicle; determining a second state of the vehicle associated with the second time; determining that the second state satisfies the condition; and causing the vehicle to be controlled vehicle according to the second operational mode H: The method of paragraph G, further comprising: generating a simulation based at least in part on the data; and determining a time period associated with the state of the vehicle wherein the first time is associated with the time period, wherein disabling the engagement of the second operational mode comprises disabling the engagement during the time period in the simulation I: The method of any one of paragraphs F-H, further comprising: generating a simulation based at least in part on the data, wherein the simulation is generated to evaluate a performance of an autonomous controller in a scenario in the environment; initiating the simulation, wherein initiating the simulation causes a first simulated vehicle to operate in the simulation based on the data; receiving, at a second time, a second request to engage the second operational mode in association with the simulation; engaging the second operational mode at the second time based at least in part on the request, wherein engaging the second operational mode causes the autonomous controller to control a second simulated vehicle in the simulation; determining a third time associated with an action determination by the autonomous controller in response to the scenario; and determining to stop the simulation at the third time J: The method of paragraph I, wherein determining to stop the simulation comprises: determining a difference between a first position associated with the data and a second position determined based at least in part on the second controller meets or exceeds a threshold difference K: The method of any one of paragraphs F-J, wherein: the first operational mode comprises at least one of: a manual control of the vehicle; a semi-autonomous control of the vehicle; or an autonomous control of the vehicle by a first autonomous controller; and the second operational mode comprises at least one of: the autonomous control of the vehicle by the first autonomous controller; or the autonomous control of the vehicle by a second autonomous controller L: The method of any one of paragraphs F-K, further comprising determining one or more of a start time or a stop time associated with the state; and associating the start time or the stop time with the data in a datastore for use in a simulation M: The method of any one of paragraphs F-L, further comprising receiving additional data corresponding to the operation of the vehicle, the additional data comprising at least one of: map data associated with a map of the environment; a vehicle trajectory of the vehicle operating in the environment; object data associated with a detected object in the environment; an action determined by a controller of the vehicle; or a time period associated with a maneuver that fails to satisfy the condition, wherein the data and the additional data is configured to be used by a simulation computing system to generate a simulation of the operation of the vehicle in the environment.

N: The method of any one of paragraphs F-M, wherein the state comprises at least one of: a lane change; a transition through a junction; or a deviation from a vehicle path associated with traveling around an obstacle O: A system or device comprising: one or more processors; and one or more non-transitory computer readable media storing instructions that, when executed, cause the one or more processors to perform a computer-implemented method as described in any one of paragraphs F-M P: A system or device comprising: a means for processing; and a means for storing coupled to the means for processing, the means for storing including instructions to configure one or more devices to perform a computer-implemented method as described in any one of paragraphs F-M.

Q: One or more non-transitory computer readable media storing instructions that, when executed, cause one or more processors to perform a method recited in any one of paragraphs F-M R: One or more non-transitory computer-readable media storing instructions that, when executed, cause one or more processors to perform operations comprising: receiving data associated with operation of a vehicle through an environment, in accordance with a in a first operational mode, the data comprising one or more of sensor data; receiving, at a first time, a request to engage a second operational mode of the vehicle which is different than the first operational mode; determining, based at least in part on the data, a state of the vehicle at the first time; determining that the state fails to satisfy a condition associated with an engagement of the second operational mode; and disabling the engagement of the second operational mode, wherein the vehicle continues the operation according to the first operational mode S: The one or more non-transitory computer-readable media of paragraph R, wherein the request is a first request, and the state is a first state, the operations further comprising: receiving, at a second time, a second request to engage the second operational mode of the vehicle; determining a second state of the vehicle at the second time; determining that the second state satisfies the condition; and enabling engagement of the second operational mode T: The one or more non-transitory computer-readable media of either paragraph R or paragraph S, the operations further comprising: generating a simulation based at least in part on the data; and determining a time period associated with the state of the vehicle wherein the first time is associated with the time period, wherein disabling the engagement of the second operational mode comprises disabling the engagement during the time period U: The one or more non-transitory computer-readable media of any one of paragraphs R-T, wherein the state comprises at least one of: a lane change; a transition through a junction; or a deviation from a vehicle path associated with traveling around an obstacle V: The one or more non-transitory computer-readable media of any one of paragraphs R-U, wherein: the request is received based on input from an operator of the vehicle; the first operational mode comprises a manual mode or a semi-autonomous mode of the operation of the vehicle; and the second operational mode comprises an autonomous mode of the operation of the vehicle W: The one or more non-transitory computer-readable media of any one of paragraphs R-V, wherein: the first operational mode comprises at least one of: a manual control of the vehicle; a semi-autonomous control of the vehicle; or an autonomous control of the vehicle by a first autonomous controller; and the second operational mode comprises at least one of: the autonomous control of the vehicle by the first autonomous controller; or the autonomous control of the vehicle by a second autonomous controller X: A system comprising: one or more processors; and memory storing processor-executable instructions that, when executed by the one or more processors, configure the system to: receive, from a vehicle computing device, data associated with an operation of a vehicle in an environment, wherein the vehicle is at least partially controlled by a first autonomous controller during the operation; generate a simulation based at least in part on the data, wherein the simulation is generated to evaluate a second autonomous controller configured to control operations of the vehicle; identify a maneuver of the vehicle during the operation of the vehicle in the environment; determine that the maneuver fails to satisfy a condition associated with an engagement of the second autonomous controller; determine a time period associated with the maneuver; and disable the engagement of the second autonomous controller during the time period in the simulation Y: The system of paragraph X, wherein the maneuver is a first maneuver, the time period is a first time period, and the system is further configured to: identify a second maneuver of the vehicle during the operation; determine that the second maneuver satisfies the condition associated with engagement of the second autonomous controller; determine a second time period associated with the maneuver; and enable the engagement of the second autonomous controller in the simulation at a time associated with the second time period Z: The system of either paragraph X or paragraph Y, wherein the system is further configured to: receive a request to enable the second autonomous controller; determine that a time associated with the request corresponds to the first time period or the second time period; and perform at least one of: based on determination that the time corresponds to the first time period, cause the first autonomous controller to control a simulated vehicle in the simulation; or based on determination that the time corresponds to the second time period, cause the second autonomous controller to control the simulated vehicle in the simulation AA: The system of any one of paragraphs X-Z, wherein the data comprises at least one of: sensor data associated with a sensor of the vehicle; map data associated with a map of the environment; a vehicle trajectory of the vehicle operating in the environment; object data associated with a detected object in the environment; an action determined by the first autonomous controller; or a time period associated with a maneuver that fails to satisfy the condition AB: The system of any one of paragraphs X-AA, wherein the maneuver comprises at least one of: a lane change; a transition through a junction; or a deviation from a vehicle path associated with traveling around an obstacle AC: A method comprising: receiving, from a vehicle computing device, data associated with an operation of a vehicle in an environment; generating a simulation based at least in part on the data; identifying a state of the vehicle during the operation of the vehicle in the environment based at least in part on the data; determining that the state fails to satisfy a condition associated with an engagement of a vehicle controller; determining a time period associated with the maneuver; and disabling the engagement of the vehicle controller during the time period in the simulation.

AD: The method of paragraph AC, wherein the vehicle is controlled at least in part by a first vehicle controller during the operation of the vehicle in the environment, and the vehicle controller associated with the simulation is a second vehicle controller, the method further comprising: initiating the simulation, wherein initiating the simulation causes a simulated vehicle to operate in the simulation based on the data; receiving a request to enable the second vehicle controller; determining that a time associated with the request corresponds to the time period; and causing the first vehicle controller to control the simulated vehicle in the simulation based at least in part on determining that the time corresponds to the time period AE: The method of either paragraph AC or AD, wherein the maneuver is a first state, the time period is a first time period, the method further comprising: identifying a second maneuver of the vehicle during the operation; determining that the second maneuver satisfies the condition associated with engagement of the autonomous controller; determining a second time period associated with the maneuver; and enabling the engagement of the autonomous controller in the simulation at a time associated with the second time period AF: The method of paragraph AE, wherein the vehicle is controlled at least in part by a first vehicle controller during the operation of the vehicle in the environment, and the vehicle controller associated with the simulation is a second vehicle controller, the method further comprising: initiating the simulation, wherein initiating the simulation causes a first simulated vehicle to operate in the simulation based on the data; receiving a request to enable the second vehicle controller; determining that a time associated with the request corresponds to the second time period; and causing the second vehicle controller to control a second simulated vehicle in the simulation based at least in part on determining that the time corresponds to the second time period AG: The method of any one of paragraphs AC-AF, wherein the time period is a first time period, the method further comprising: determining an engagement time associated with engaging the vehicle controller based at least in part on the first time period, wherein the engagement time is associated with a second time period that is different from the first time period; initiating the simulation, wherein initiating the simulation causes a simulated vehicle to operate in the simulation based on the data; determining that a current time is associated with the engagement time; and causing the vehicle controller to control the simulated vehicle in the simulation based at least in part on determining that the current time is associated with the engagement time AH: The method of paragraph AG, further comprising: determining to stop the simulation based at least in part on a distance between a first position associated the vehicle and based on the data and a second position of the second simulated vehicle is equal to or greater than the threshold distance AI: The method of paragraph AG, further comprising: determining to stop the simulation based at least in part on determining that a second time period has elapsed AJ: The method of any one of paragraphs AC-AI, wherein: the data comprises one or more of start time or a stop time associated with the state; the data further comprises an indication that the state fails to satisfy the condition; and the time period is determined based at least in part on one or more of the start time or the stop time AK: The method of any one of paragraphs AC-AJ, wherein the maneuver comprises at least one of: a lane change; a transition through a junction; or a deviation from a vehicle path associated with traveling around an obstacle AL: A system or device comprising: one or more processors; and one or more non-transitory computer readable media storing instructions that, when executed, cause the one or more processors to perform a computer-implemented method as described in any one of paragraphs AC-AK AM: A system or device comprising: a means for processing; and a means for storing coupled to the means for processing, the means for storing including instructions to configure one or more devices to perform a computer-implemented method as described in any one of paragraphs AC-AK.

AN: One or more non-transitory computer readable media storing instructions that, when executed, cause one or more processors to perform a method recited in any one of paragraphs AC-AK AO: One or more non-transitory computer-readable media storing instructions that, when executed, cause one or more processors to perform operations comprising: receiving data associated with an operation of a vehicle in an environment; generating a simulation based at least in part on the data; identifying a state of the vehicle during the operation of the vehicle in the environment based at least in part on the data; determining that the state fails to satisfy a condition associated with an engagement of a vehicle controller; determining a time period associated with the maneuver; and disabling the engagement of the vehicle controller during the time period in the simulation AP: The one or more non-transitory computer-readable media of paragraph AO, wherein the vehicle is controlled at least in part by a first vehicle controller during the operation of the vehicle in the environment, and the vehicle controller associated with the simulation is a second vehicle controller, the operations further comprising: initiating the simulation, wherein initiating the simulation causes a simulated vehicle to operate in the simulation based on the data; receiving a request to enable the second vehicle controller; determining that a time associated with the request corresponds to the time period; and causing the first vehicle controller to control the simulated vehicle in the simulation based at least in part on determining that the time corresponds to the time period AQ: The one or more non-transitory computer-readable media of paragraph AO or paragraph AP, wherein the state is a first state, the time period is a first time period, the operations comprising: identifying a second state of the vehicle during the operation; determining that the second state satisfies the condition associated with engagement of the vehicle controller; determining a second time period associated with the second state; and enabling the engagement of the vehicle controller in the simulation during the second time period AR: The one or more non-transitory computer-readable media of paragraph AQ, wherein the vehicle is controlled at least in part by a first vehicle controller during the operation of the vehicle in the environment, and the vehicle controller associated with the simulation is a second vehicle controller, the operations further comprising: initiating the simulation, wherein initiating the simulation causes a first simulated vehicle to operate in the simulation based on the data; receiving a request to enable the second vehicle controller; determining that a time associated with the request corresponds to the second time period; and causing the second vehicle controller to control the simulated vehicle in the simulation based at least in part on determining that the time corresponds to the second time period AS: The one or more non-transitory computer-readable media of any one of paragraphs AO-AR, wherein the data comprises at least one of: sensor data associated with a sensor of the vehicle; map data corresponding to a map of the environment; a vehicle trajectory of the vehicle operating in the environment; object data associated with a detected object in the environment; an action determined by a controller of the vehicle; or a time period associated with a maneuver that fails to satisfy the condition AT: The one or more non-transitory computer-readable media of any one of paragraphs AO-AS, wherein the maneuver comprises at least one of: a first movement of the vehicle from a first location associated with a first lane to a second location associated with a second lane; or a second movement of the vehicle through a junction.

While the example clauses described above are described with respect to one particular implementation, it should be understood that, in the context of this document, the content of the example clauses may also be implemented via a method, device, system, a computer-readable medium, and/or another implementation. Additionally, any of examples A-AT may be implemented alone or in combination with any other one or more of the examples A-AT.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   memory storing processor-executable instructions that, when executed by the one or more processors, configure the system to:
   receive data associated with a vehicle, wherein the data is associated with an operation of the vehicle in a first operational mode, wherein the first operational mode comprises one of:
   manual control of the vehicle;
   semi-autonomous control of the vehicle; or
   autonomous control of the vehicle by a first autonomous controller;
   receive, at a first time, a request to engage a second operational mode of the vehicle, wherein the second operational mode is different than the first operational mode and wherein:
   if the first operational mode comprises manual control of the vehicle or semi-autonomous control of the vehicle, then the second operational mode comprises autonomous control of the vehicle by the first autonomous controller; or
   if the first operational mode comprises autonomous control of the vehicle by the first autonomous controller, then the second operational mode comprises autonomous control of the vehicle by a second autonomous controller;
   generate, based at least in part on the data, a simulation configured to test a performance of the second autonomous controller;

determine, based at least in part on the data, a maneuver of the vehicle in the simulation associated with the first time;

determine that the maneuver in the simulation fails to satisfy a condition associated with an engagement of the second operational mode; and disable the engagement of the second operational mode, wherein a disabled engagement of the second operational mode causes the vehicle to continue operating according to the first operational mode.

2. The system of claim 1, wherein the request is a first request, the maneuver is a first maneuver, and the instructions further configure the one or more processors to:

receive, at a second time, a second request to engage the second operational mode of the vehicle;

determine a second maneuver of the vehicle associated with the second time;

determine that the second maneuver satisfies the condition; and cause the vehicle to be controlled according to the second operational mode.

3. The system of claim 1, wherein the instructions further configure the one or more processors to:

determine a time period associated with the maneuver, wherein the first time is associated with the time period, wherein disabling the engagement is based at least in part on a determination that the first time is associated with the time period.

4. The system of claim 1, wherein the request to engage the second operational mode is received from:

a simulation computing device; or a vehicle computing device.

5. The system of claim 1, wherein the maneuver comprises at least one of:

a lane change;

a transition through a junction; or a deviation from a vehicle path associated with traveling around an obstacle.

6. A method comprising:

receiving data associated with an operation of a vehicle through an environment, in accordance with a first operational mode;

receiving, at a first time, a request to engage a second operational mode of the vehicle which is different than the first operational mode, the second operational mode comprising fully autonomous control of the vehicle by an autonomous controller;

generating, based at least in part on the data, a simulation configured to test a performance of the autonomous controller;

determining, based at least in part on the data, a state of the vehicle in the simulation at the first time;

determining that the state of the vehicle in the simulation fails to satisfy a condition associated with an engagement of the second operational mode; and disabling the engagement of the second operational mode, wherein a disabled engagement of the second operational mode causes the vehicle to continue operating according to the first operational mode.

7. The method of claim 6, wherein the request is a first request, and the state is a first state, the method further comprising:

receiving, at a second time, a second request to engage the second operational mode of the vehicle;

determining a second state of the vehicle associated with the second time;

determining that the second state satisfies the condition; and causing the vehicle to be controlled according to the second operational mode.

8. The method of claim 7, further comprising:

determining a time period associated with the state of the vehicle in the simulation wherein the first time is associated with the time period, wherein disabling the engagement of the second operational mode comprises disabling the engagement during the time period in the simulation.

9. The method of claim 6, further comprising:

generating the simulation based at least in part on the data, wherein the simulation is generated to evaluate the performance of the autonomous controller in a scenario in the environment;

initiating the simulation, wherein initiating the simulation causes a first simulated vehicle to operate in the simulation based on the data;

receiving, at a second time, a second request to engage the second operational mode in association with the simulation;

engaging the second operational mode at the second time based at least in part on the request, wherein engaging the second operational mode causes the autonomous controller to control a second simulated vehicle in the simulation;

determining a third time associated with an action determination by the autonomous controller in response to the scenario; and determining to stop the simulation at the third time.

10. The method of claim 9, wherein determining to stop the simulation comprises:

determining a difference between a first position associated with the data and a second position determined based at least in part on the autonomous controller meets or exceeds a threshold difference.

11. The method of claim 6, wherein:

the first operational mode comprises one of:

manual control of the vehicle;

semi-autonomous control of the vehicle; or autonomous control of the vehicle by a first autonomous controller; and wherein:

if the first operational mode comprises manual control of the vehicle or semi-autonomous control of the vehicle, then the second operational mode comprises autonomous control of the vehicle by the first autonomous controller; or if the first operational mode comprises autonomous control of the vehicle by the first autonomous controller, then the second operational mode comprises autonomous control of the vehicle by a second autonomous controller.

12. The method of claim 6, further comprising:

determining one or more of a start time or a stop time associated with the state; and associating the start time or the stop time with the data in a datastore for use in a simulation.

13. The method of claim 6, further comprising receiving additional data corresponding to the operation of the vehicle, the additional data comprising at least one of:

map data associated with a map of the environment;

a vehicle trajectory of the vehicle operating in the environment;

object data associated with a detected object in the environment;

an action determined by a controller of the vehicle; or a time period associated with a maneuver that fails to satisfy the condition, wherein the data and the additional data is configured to be used by a simulation computing system to generate a simulation of the operation of the vehicle in the environment.

14. The method of claim 6, wherein the state comprises at least one of:

a lane change;

a transition through a junction; or a deviation from a vehicle path associated with traveling around an obstacle.

15. One or more non-transitory computer-readable media storing instructions that, when executed, cause one or more processors to perform operations comprising:

receiving data associated with operation of a vehicle through an environment, in accordance with a first operational mode, the data comprising sensor data;

receiving, at a first time, a request to engage a second operational mode of the vehicle which is different than the first operational mode, the second operational mode comprising fully autonomous control of the vehicle by an autonomous controller;

generating, based at least in part on the data, a simulation configured to test a performance of the autonomous controller;

determining, based at least in part on the data, a state of the vehicle in the simulation at the first time;

determining that the state of the vehicle in the simulation fails to satisfy a condition associated with an engagement of the second operational mode; and disabling the engagement of the second operational mode, wherein the vehicle continues the operation according to the first operational mode.

16. The one or more non-transitory computer-readable media of claim 15, wherein the request is a first request, and the state is a first state, the operations further comprising:

receiving, at a second time, a second request to engage the second operational mode of the vehicle;

determining a second state of the vehicle at the second time;

determining that the second state satisfies the condition; and enabling engagement of the second operational mode.

17. The one or more non-transitory computer-readable media of claim 15, the operations further comprising:

determining a time period associated with the state of the vehicle in the simulation wherein the first time is associated with the time period, wherein disabling the engagement of the second operational mode comprises disabling the engagement during the time period.

18. The one or more non-transitory computer-readable media of claim 15, wherein the state comprises at least one of:

a lane change;

a transition through a junction; or a deviation from a vehicle path associated with traveling around an obstacle.

19. The one or more non-transitory computer-readable media of claim 15, wherein:

the request is received based on input from an operator of the vehicle;

the first operational mode comprises a manual mode or a semi-autonomous mode of the operation of the vehicle; and the second operational mode comprises an autonomous mode of the operation of the vehicle.

20. The one or more non-transitory computer-readable media of claim 15, wherein:

the first operational mode comprises at least one of:

manual control of the vehicle;

semi-autonomous control of the vehicle; or autonomous control of the vehicle by a first autonomous controller; and wherein:

if the first operational mode comprises manual control of the vehicle or semi-autonomous control of the vehicle, then the second operational mode comprises autonomous control of the vehicle by the first autonomous controller; or if the first operational mode comprises autonomous control of the vehicle by the first autonomous controller, then the second operational mode comprises autonomous control of the vehicle by a second autonomous controller.

\* \* \* \* \*